United States Patent
Chen et al.

(10) Patent No.: US 10,681,338 B1
(45) Date of Patent: Jun. 9, 2020

(54) DETECTING INTERFERENCE IN DEPTH IMAGES CAPTURED USING OVERLAPPING DEPTH CAMERAS

(71) Applicant: Amazon Technologies, Inc., Seattle, WA (US)

(72) Inventors: Bo Chen, Bothell, WA (US); Venkata Sri Krishnakanth Pulla, Mill Creek, WA (US); Junrong Yan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/144,567

(22) Filed: Sep. 27, 2018

Related U.S. Application Data

(60) Provisional application No. 62/702,823, filed on Jul. 24, 2018.

(51) Int. Cl.
| | |
|---|---|
| *H04N 13/296* | (2018.01) |
| *H04N 13/282* | (2018.01) |
| *H04N 13/271* | (2018.01) |
| *H04N 13/254* | (2018.01) |

(52) U.S. Cl.
CPC ......... *H04N 13/296* (2018.05); *H04N 13/254* (2018.05); *H04N 13/271* (2018.05); *H04N 13/282* (2018.05)

(58) Field of Classification Search
CPC .. H04N 13/296; H04N 13/271; H04N 13/254; H04N 13/282
See application file for complete search history.

(56) References Cited

U.S. PATENT DOCUMENTS

| | | |
|---|---|---|
| 7,225,980 B2 | 6/2007 | Ku et al. |
| 7,405,812 B1 | 7/2008 | Bamji |
| 7,949,568 B2 | 5/2011 | Fano et al. |
| 8,009,864 B2 | 8/2011 | Linaker et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Gevell V Selby
(74) *Attorney, Agent, or Firm* — Athorus, PLLC

(57) ABSTRACT

Discrete frequencies and time slots of operation are assigned to each of a plurality of time-of-flight cameras. Where two time-of-flight cameras having overlapping fields of view, whether the time-of-flight cameras are operating at the same frequency or time slot is determined by calculating ratios of zero-value pixels to total numbers of pixels for each depth image captured by the time-of-flight cameras over a selected interval. If the time-of-flight cameras operate at the same frequency or time slot, a plot of the ratios of depth images captured using one time-of-flight camera is erratically sinusoidal. Another time-of-flight camera causing the interference may be identified among time-of-flight cameras operating at the frequency or time slot, based on areas of interest that overlap with the time-of-flight camera, or based on a time at which the time-of-flight cameras began capturing depth images, as compared to a time at which the interference is observed.

20 Claims, 18 Drawing Sheets

(56) References Cited

U.S. PATENT DOCUMENTS

| | | | |
|---|---|---|---|
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0033045 A1 | 2/2012 | Schweizer et al. | |
| 2012/0284132 A1 | 11/2012 | Kim et al. | |
| 2013/0076898 A1 | 3/2013 | Philippe et al. | |
| 2013/0148102 A1 | 6/2013 | Oggier | |
| 2013/0253700 A1 | 9/2013 | Carson et al. | |
| 2014/0055771 A1 | 2/2014 | Oggier | |
| 2014/0152974 A1 | 6/2014 | Ko | |
| 2014/0279294 A1 | 9/2014 | Field-Darragh et al. | |
| 2014/0313376 A1 | 10/2014 | Nieuwenhove et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0373322 A1 | 12/2015 | Goma et al. | |
| 2016/0309133 A1* | 10/2016 | Laroia | H04N 5/2258 |
| 2017/0188019 A1 | 6/2017 | Kashyap | |
| 2017/0275023 A1 | 9/2017 | Harris et al. | |
| 2017/0323455 A1 | 11/2017 | Bittan et al. | |
| 2018/0081033 A1 | 3/2018 | Demirtas et al. | |
| 2018/0259628 A1 | 9/2018 | Plank et al. | |
| 2018/0300891 A1 | 10/2018 | Wang et al. | |
| 2018/0302611 A1 | 10/2018 | Baak et al. | |
| 2018/0348345 A1 | 12/2018 | Haroun et al. | |
| 2018/0350087 A1* | 12/2018 | Kowdle | H04N 13/271 |
| 2019/0035099 A1 | 1/2019 | Afrouzi et al. | |
| 2019/0049962 A1 | 2/2019 | Ouellette et al. | |
| 2019/0105514 A1* | 4/2019 | Amstutz | A61B 5/1127 |
| 2019/0109977 A1 | 4/2019 | Dutton et al. | |
| 2019/0213895 A1 | 7/2019 | Omari et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Drown, Dan, "PPS over USB," Jul. 12, 2017, URL: http://blog.dan.drown.org/pps-over-usb/, downloaded on Jun. 20, 2018, 12 pages.

* cited by examiner

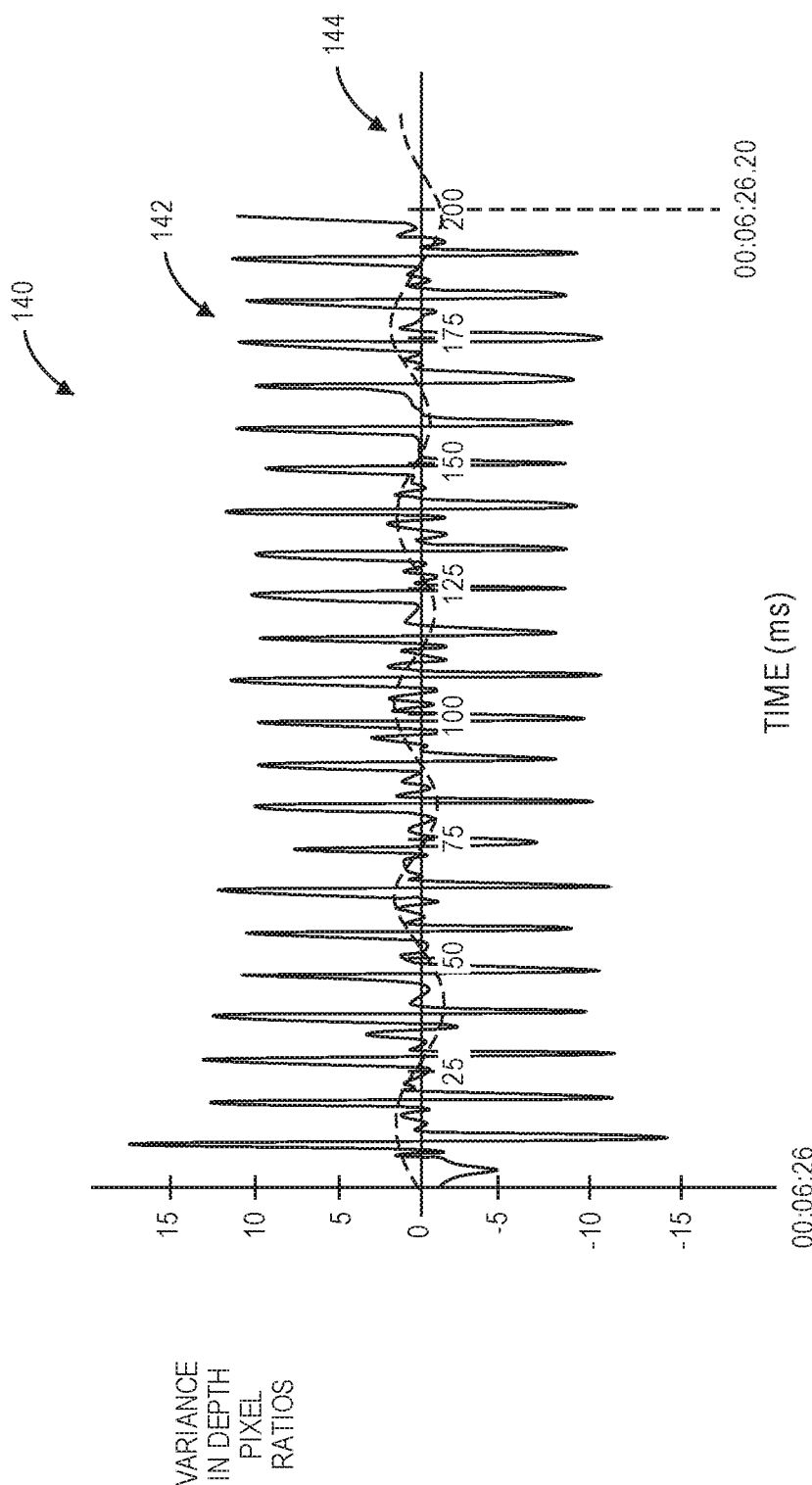

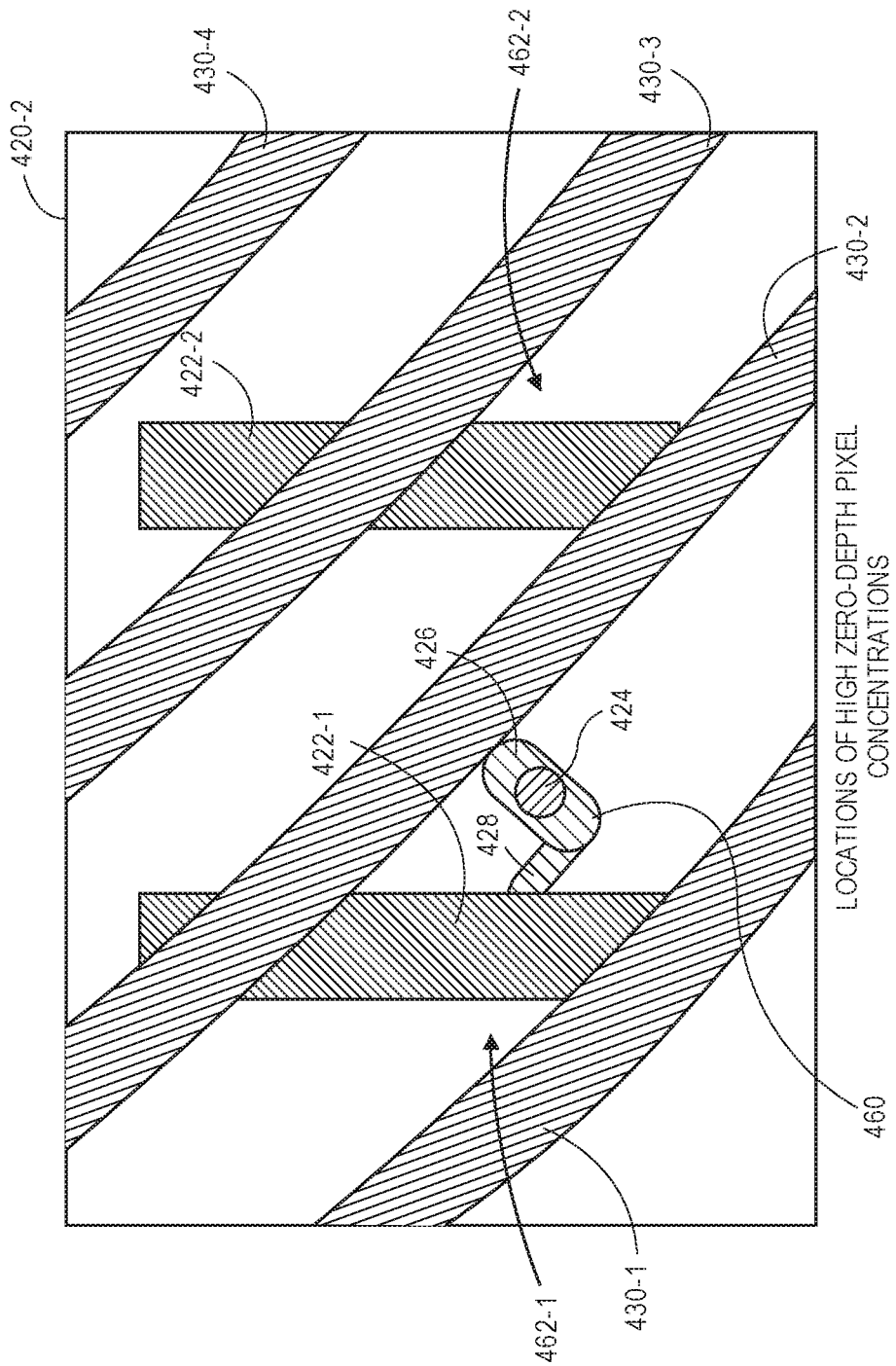

DETECTING INTERFERENCE IN DEPTH IMAGES CAPTURED USING OVERLAPPING DEPTH CAMERAS

CROSS-REFERENCE TO RELATED APPLICATIONS

This application claims priority to U.S. Patent Application No. 62/702,823, filed Jul. 24, 2018, the contents of which are incorporated by reference herein in their entirety.

BACKGROUND

A "time-of-flight" camera is a depth-sensing or range-sensing system that operates by illuminating a scene using a light source (e.g., a modulated source of light at any wavelength or frequency, such as infrared) and capturing light that is reflected from various points of the scene following the illumination. Time-of-flight cameras are typically equipped with an illuminator for illuminating a scene, and a sensor for capturing reflected light from the scene. The reflected light that is captured by a time-of-flight camera sensor may be interpreted to generate a depth profile of portions of the scene within a field of view of the time-of-flight camera. Some time-of-flight cameras may capture and interpret reflected light, and generate depth images or profiles of portions of scenes from such reflected light, dozens of times per second. Depth images or profiles generated by time-of-flight cameras can be very accurate.

Occasionally, where two or more time-of-flight cameras are mounted at scenes with overlapping fields of view, care must be taken when operating the time-of-flight cameras. Where an illuminator of a first time-of-flight camera illuminates a scene, and a sensor of a second time-of-flight camera having an overlapping field of view is exposed, reflections of the light projected onto the scene from the illuminator of the first time-of-flight camera may be detected by the sensor of the second time-of-flight camera, thereby causing the first time-of-flight camera to interfere with depth imaging data captured using the second time-of-flight camera, and resulting in a false construction of a depth profile by the second time-of-flight camera. To alleviate this effect, a discrete modulation frequency may be assigned to each of the time-of-flight cameras that are mounted at a scene with overlapping fields of view, and the times at which such cameras operate illuminators to illuminate scenes and expose sensors to capture reflected light from such scenes may be sequenced (or staggered). In this regard, time-of-flight cameras may operate in concert, while ensuring that a sensor of one time-of-flight camera is exposed only at times when an illuminator of that time-of-flight camera has illuminated a scene, and not at other times, e.g., when an illuminator of another time-of-flight camera has illuminated the scene.

Occasionally, and from time to time, assigning time slots and modulation frequencies to multiple time-of-flight cameras provided at a scene does not eliminate the risk of interference between two or more of the time-of-flight cameras that have overlapping fields of view. For example, where a time-of-flight camera is newly installed at a scene where one or more time-of-flight cameras is already present, or where a time slot or frequency of operation is assigned to a time-of-flight camera and unintentionally coincides with another time slot or frequency of operation assigned to another time-of-flight camera, undesirable interference may be observed within depth imaging data captured using one or both of the time-of-flight cameras. Detecting interference within depth imaging data captured by a time-of-flight camera, or identifying another time-of-flight camera that is causing the interference, are typically difficult tasks.

BRIEF DESCRIPTION OF THE DRAWINGS

FIGS. 1A through 1H are views of aspects of one system for detecting interference in depth images captured using overlapping depth cameras in accordance with implementations of the present disclosure.

FIGS. 4A through 4C are views of aspects of one system for detecting interference in depth images captured using overlapping depth cameras in accordance with implementations of the present disclosure.

DETAILED DESCRIPTION

Figure 1A:
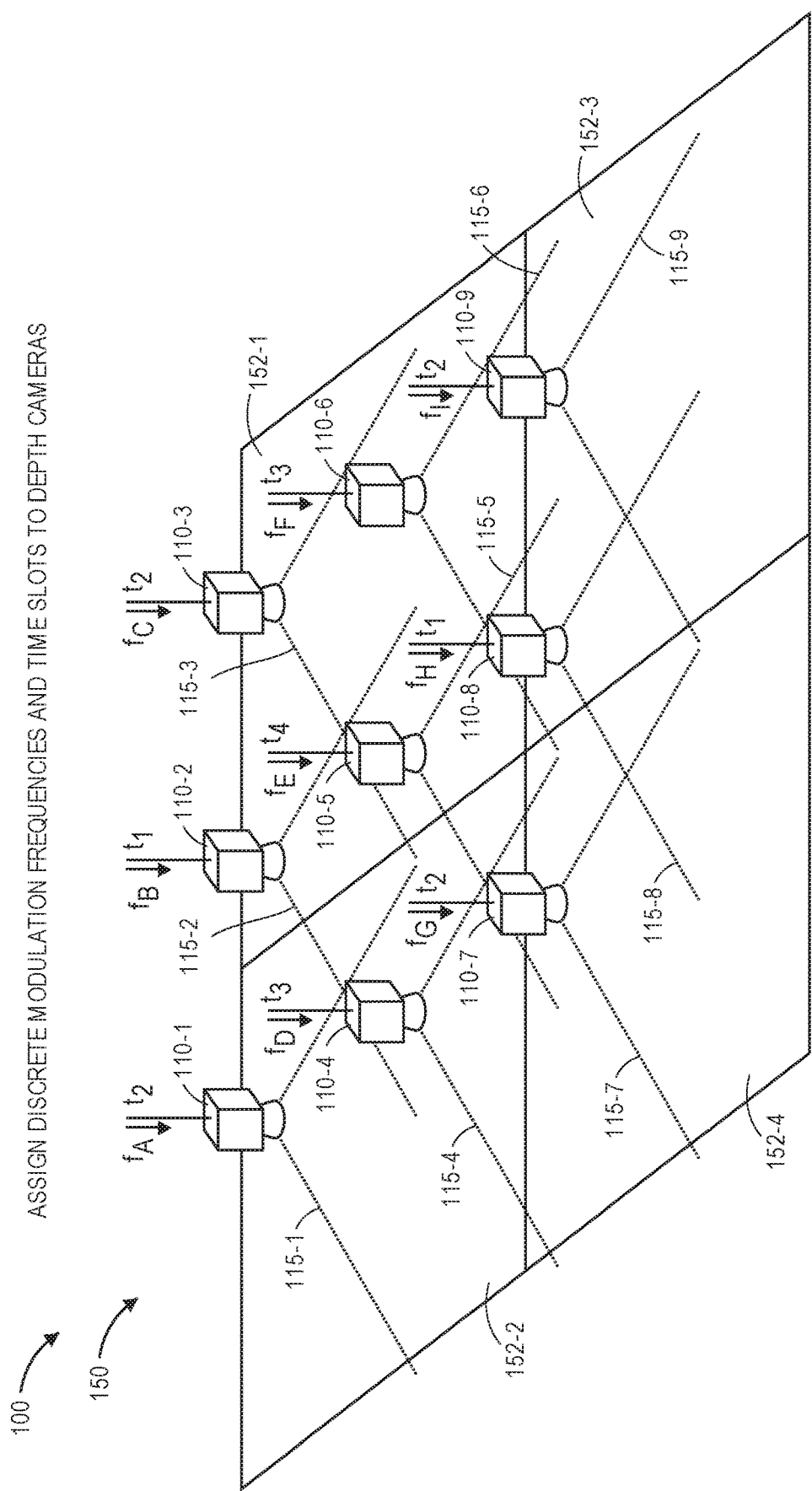

As is set forth in greater detail below, the present disclosure is directed to detecting interference within depth imaging data captured by a time-of-flight camera, and identifying another time-of-flight camera that is responsible for the interference. More specifically, some implementations of the present disclosure are directed to capturing streams of depth imaging data (e.g., depth images) and calculating depth noise ratios for images of the streams that are captured within intervals of time based on a number of zero-depth pixels and a total number of pixels for each of such images. The depth noise ratios may be graphed or plotted in one or more representations, and frames having substantial portions of zero-depth pixels may be identified by "flickers" in such representations accordingly. Where a waveform or other representation of such ratios in a graph or plot over time indicates repeated patterns of significant numbers or ratios of zero-depth pixels within a depth image, e.g., with maximum and minimum values of such numbers or ratios in repeated succession, such as in a difference plot, such patterns are indicative of depth interference within such depth imaging data. A signature corresponding to depth noise ratios of the stream may be generated and used to determine whether the time-of-flight camera that captured the depth imaging data is encountering interference from the operation of another time-of-flight camera having an overlapping field of view.

Upon detecting interference in depth images captured using a time-of-flight camera, some implementations of the present disclosure are directed to identifying one or more other time-of-flight cameras associated with the interference. For example, in some implementations, a plurality of other time-of-flight cameras that have been assigned to operate within the same time slot or at the same modulation frequency as a time-of-flight camera for which interference has been detected may be identified, and one or more of the time-of-flight cameras may be selected from the plurality of other time-of-flight cameras. In some implementations, a plurality of other time-of-flight cameras that also include one or more areas of interest in common with a time-of-flight camera for which interference has been detected may be identified, and one or more of the time-of-flight cameras may be selected from the plurality of other time-of-flight cameras. In some implementations, a plurality of other time-of-flight cameras that were assigned the same time slots or modulation frequencies, or began operating at a time that interference was detected in imaging data captured by one time-of-flight camera, may be identified and one or more of the time-of-flight cameras may be selected from the plurality of other time-of-flight cameras.

In accordance with some embodiments of the present disclosure, depth interference that has been detected between two or more time-of-flight cameras may be addressed in any number of ways. For example, in some implementations, a time-of-flight camera that has detected interference may be shut down, or may continue to operate with the expectation that interference will be present within some depth images captured in the future, as long as one or more other time-of-flight cameras that are responsible for the interference continue to operate. Alternatively, in some other implementations, one or more time-of-flight cameras that are determined to operate within common time slots or at common modulation frequencies may be programmed within another time slot or at another modulation frequency that is known to not be assigned to a time-of-flight camera that has an overlapping field of view, or that is selected at random.

Referring to FIGS. 1A through 1H, views of aspects of one system 100 detecting interference in depth images captured using overlapping depth cameras in accordance with implementations of the present disclosure are shown. As is shown in FIG. 1A, the system 100 includes a plurality of time-of-flight cameras 110-1, 110-2, 110-3, 110-4, 110-5, 110-6, 110-7, 110-8, 110-9 that are mounted in association with a facility 150 (e.g., a materials handling facility) having a plurality of areas of interest 152-1, 152-2, 152-3, 152-4, which may be two-dimensional portions of floors or other working surfaces within the facility 150, or three-dimensional regions in space within the facility 150. The time-of-flight cameras 110-1, 110-2, 110-3, 110-4, 110-5, 110-6, 110-7, 110-8, 110-9 have fields of view 115-1, 115-2, 115-3, 115-4, 115-5, 115-6, 115-7, 115-8, 115-9 that overlap over the facility 150. Each of the fields of view 115-1, 115-2, 115-3, 115-4, 115-5, 115-6, 115-7, 115-8, 115-9 includes portions of one or more of the areas of interest 152-1, 152-2, 152-3, 152-4. As is also shown in FIG. 1A, each of the time-of-flight cameras 110-1, 110-2, 110-3, 110-4, 110-5, 110-6, 110-7, 110-8, 110-9 has been programmed to capture depth images at a discrete modulation frequency $f_A$, $f_B$, $f_C$, $f_D$, $f_E$, $f_F$, $f_G$, $f_H$, $f_I$ and a time slot $t_2$, $t_1$, $t_2$, $t_3$, $t_4$, $t_3$, $t_2$, $t_1$, $t_2$ respectively. The time slots $t_2$, $t_1$, $t_2$, $t_3$, $t_4$, $t_3$, $t_2$, $t_1$, $t_2$ assigned to the cameras 110-1, 110-2, 110-3, 110-4, 110-5, 110-6, 110-7, 110-8, 110-9 may be discrete portions of a repeated period of time, and the cameras 110-1, 110-2, 110-3, 110-4, 110-5, 110-6, 110-7, 110-8, 110-9 may be configured to illuminate their respective fields of view 115-1, 115-2, 115-3, 115-4, 115-5, 115-6, 115-7, 115-8, 115-9 and expose their respective sensors within the time slots in each successive period of time.

For example, referring to FIG. 1A, because the fields of view 115-2, 115-8 of the time-of-flight cameras 110-2, 110-8 do not overlap, the time-of-flight cameras 110-2, 110-8 may operate first, in a time slot $t_1$, to capture depth images at the respective modulation frequencies $f_B$, $f_H$. Next, because the fields of view 115-1, 115-3, 115-7, 115-9 of the time-of-flight cameras 110-1, 110-3, 110-7, 110-9 do not overlap, the time-of-flight cameras 110-1, 110-3, 110-7, 110-9 may operate next, in a time slot $t_2$, to capture depth images at the respective modulation frequencies $f_A$, $f_C$, $f_G$, $f_I$. Because the fields of view 115-4, 115-6 of the time-of-flight cameras 110-4, 110-6 do not overlap, the time-of-flight cameras 110-4, 110-6 may then operate, in a time slot $t_3$, to capture depth images at the respective modulation frequencies $f_D$, $f_F$. Finally, the time-of-flight camera 110-5 may operate, in a time slot $t_4$, to capture a depth image at the modulation frequency $f_E$. After the time-of-flight camera 110-5 has captured a depth image at the modulation frequency $f_E$, the time-of-flight cameras 110-2, 110-8 may then operate again, in another time slot $t_1$, to capture depth images at the respective modulation frequencies $f_B$, $f_H$. The process may repeat itself for as long as depth images of the facility 150 are desired.

Time slots and periods of time including two or more time slots may have any lengths or durations. For example, in a period of forty milliseconds (40 ms) in duration, four cameras may be programmed or otherwise configured to capture depth images within discrete time slots of ten milliseconds (10 ms) each.

Figure 1B:
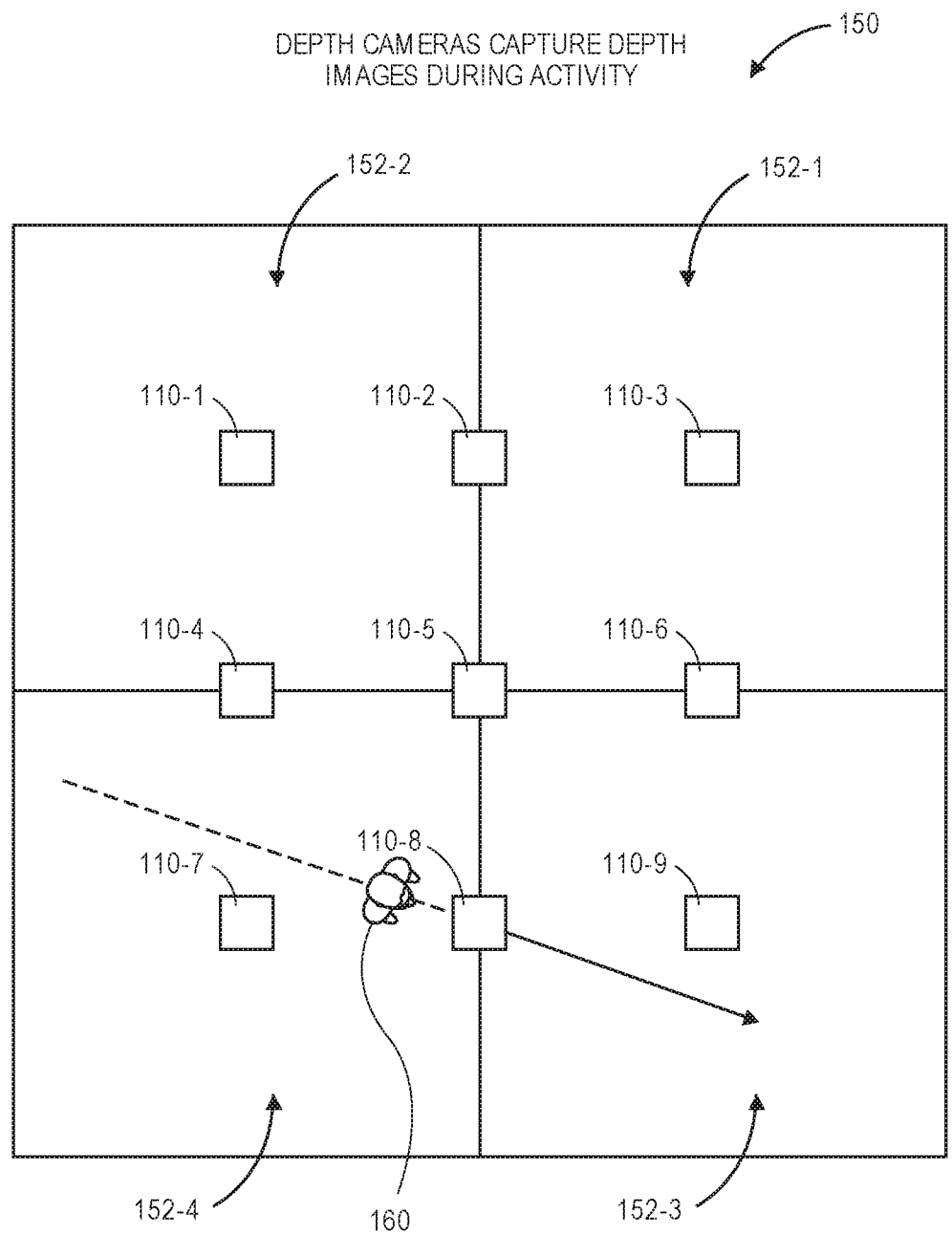
Figure 1C:
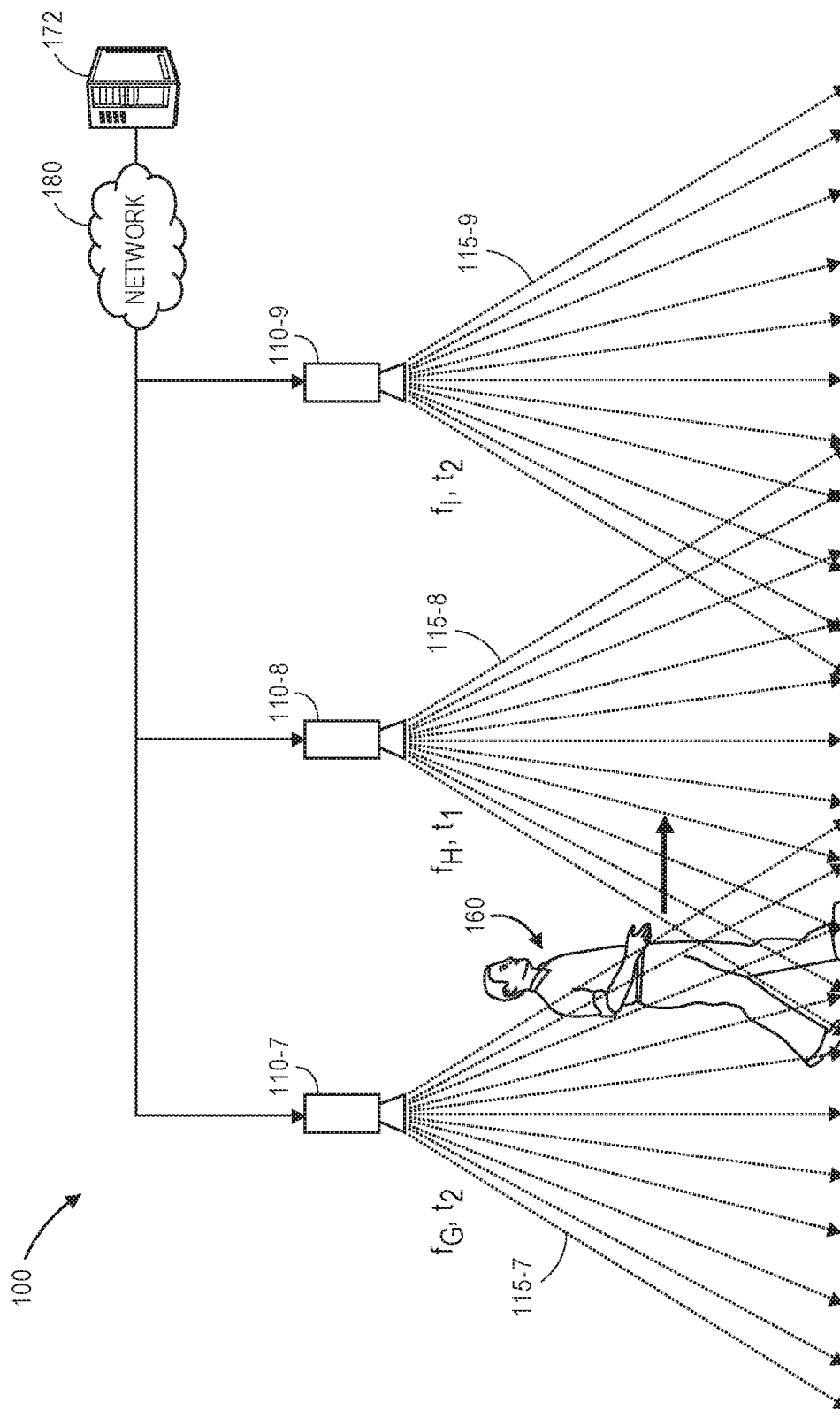

As is shown in FIG. 1B, a person 160 (e.g., a worker, a customer or another person) walks through the facility 150. The person 160 passes within the fields of view 115-1, 115-2, 115-3, 115-4, 115-5, 115-6, 115-7, 115-8, 115-9 of one or more of the time-of-flight cameras 110-1, 110-2, 110-3, 110-4, 110-5, 110-6, 110-7, 110-8, 110-9 while walking within one or more of the areas of interest 152-1, 152-2, 152-3, 152-4. As is shown in FIG. 1C, as the person 160 walks through the facility 150 within the fields of view 115-7, 115-8, 115-9, the time-of-flight cameras 110-7, 110-8, 110-9 capture depth images at the discrete frequencies of operation $f_G$, $f_H$, $f_I$ and within time slots $t_2$, $t_1$, $t_2$.

Figure 1D:
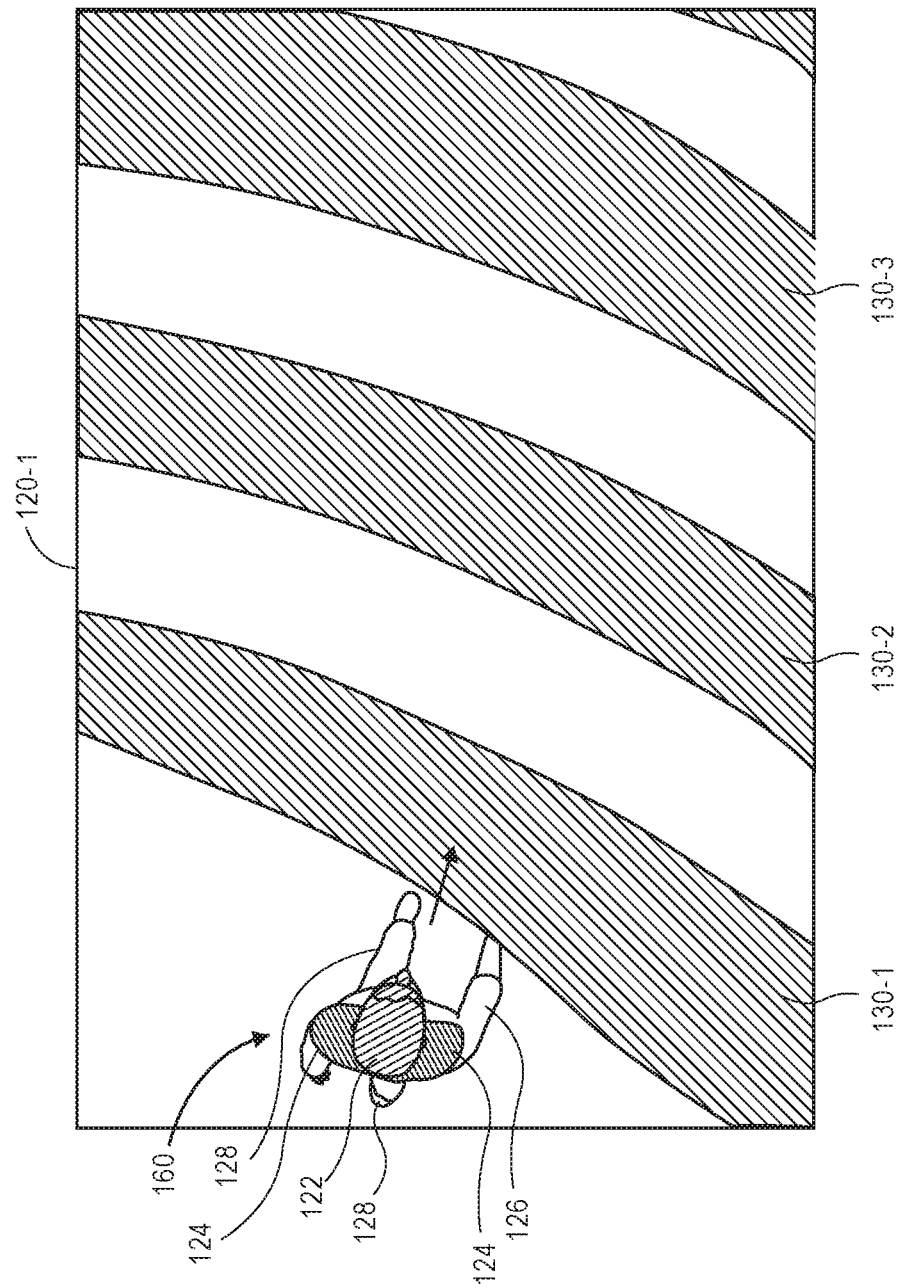

As is shown in FIG. 1D, a depth image 120-1 captured using the time-of-flight camera 110-7 includes a plurality of pixel values indicative of ranges to aspects of the person 160, including a set of pixel values 122 corresponding to a head of the person 160, a set of pixel values 124 corresponding to shoulders of the person 160, a set of pixel values 126 corresponding to arms of the person 126 and a set of pixel values 128 corresponding to legs of the person 160. The depth image 120-1 further includes a plurality of pixel values that are approximately zero, including sets of pixel values 130-1, 130-2, 130-3 in locations within the depth image 120-1 that have no bearing or relationship to any persons or objects present within the facility 150. For example, as is shown in FIG. 1D, the sets of pixel values 130-1, 130-2, 130-3 occupy substantial portions of the depth image 120-1, and render the depth image 120-1 substantially ineffective as a representation of ranges to objects within the field of view 115-7 of the time-of-flight camera 110-7.

Figure 1E:
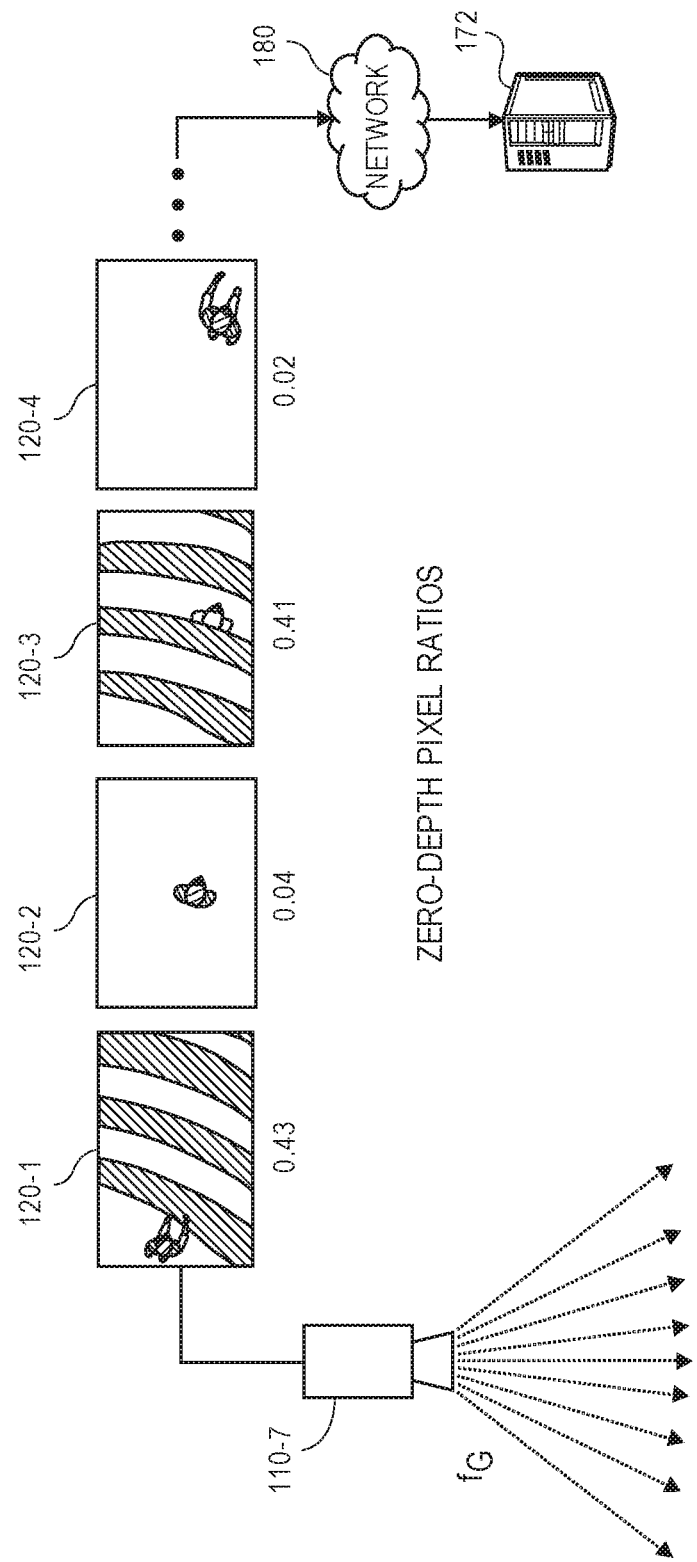

As is shown in FIG. 1E, a plurality of depth images captured using the time-of-flight camera 110-7 are provided to a server 172 over a network 180, which may include the Internet or an intranet in whole or in part, by one or more wired or wireless connections. The plurality of depth images includes not only the depth image 120-1 shown in FIG. 1D but also depth images 120-2, 120-3, 120-4 and others captured by the time-of-flight camera 110-7 thereafter, at the discrete frequency of operation $f_G$ and within the time slot $t_3$, during an interval of time Δt having a duration of two hundred milliseconds (or 200 ms).

In accordance with some implementations of the present disclosure, the server 172 may process the depth images 120-1, 120-2, 120-3, 120-4 and others captured during the interval Δt, in order to calculate a number of zero-depth pixels within each of the depth images. The server 172 may further utilize information regarding such zero-depth pixels to determine whether the time-of-flight camera 110-7 is experiencing depth interference with one or more other time-of-flight cameras having fields of view that overlap with the field of view 115-7 of the time-of-flight camera 110-7. For example, as is shown in FIG. 1E, the server 172 determines that a ratio of the number of zero-depth pixels in the depth image 120-1 to the total number of pixels in the depth image 120-1 is 0.43. Similarly, and as is also shown in FIG. 1E, the server 172 determines that a ratio of the number of zero-depth pixels in the depth image 120-2 to the total number of pixels in the depth image 120-2 is 0.04. The server 172 further determines that a ratio of the number of zero-depth pixels in the depth image 120-3, which includes sets of zero-depth pixel values that occupy substantial portions of the depth image, in a manner similar to that of the depth image 120-1, is 0.41, and that a ratio of the number of zero-depth pixels in the depth image 120-4 is 0.02.

In accordance with some implementations of the present disclosure, the server 172 may generate a graph or plot of information or data regarding the zero-depth pixels within depth images captured using the time-of-flight camera 110-7 in order to determine, based on the graph or plot, whether the time-of-flight camera 110-7 is experiencing depth interference with one or more other time-of-flight cameras having overlapping fields of view. As is shown in FIG. 1F, a difference plot 140 of variances in depth pixel ratios between consecutive depth images captured during the interval of time Δt is shown. The time-of-flight camera 110-7 may be determined to be experiencing depth interference where maximum or minimum values of the depth pixel ratios exceed a predetermined threshold, or on any other basis, such as where a difference between a number of zero-depth pixels or a ratio of zero-depth pixels within one depth image and a number of zero-depth pixels or a ratio of zero-depth pixels within another depth image (e.g., a preceding or succeeding depth image) is greater than a predetermined threshold. As is shown in FIG. 1F, a waveform of the difference plot 140 includes a substantially sinusoidal curve 142 having a plurality of maximum and minimum values repeatedly appearing at discrete locations within the sinusoidal curve 142, thereby indicating the presence of depth interference within imaging data captured using the time-of-flight camera 110-7. By comparison, and as is also shown in FIG. 1F, in the absence of depth interference, the difference plot 140 may have a curve 144 having relatively similar maximum and minimum values of zero-value pixel ratios over time.

Figure 1G:
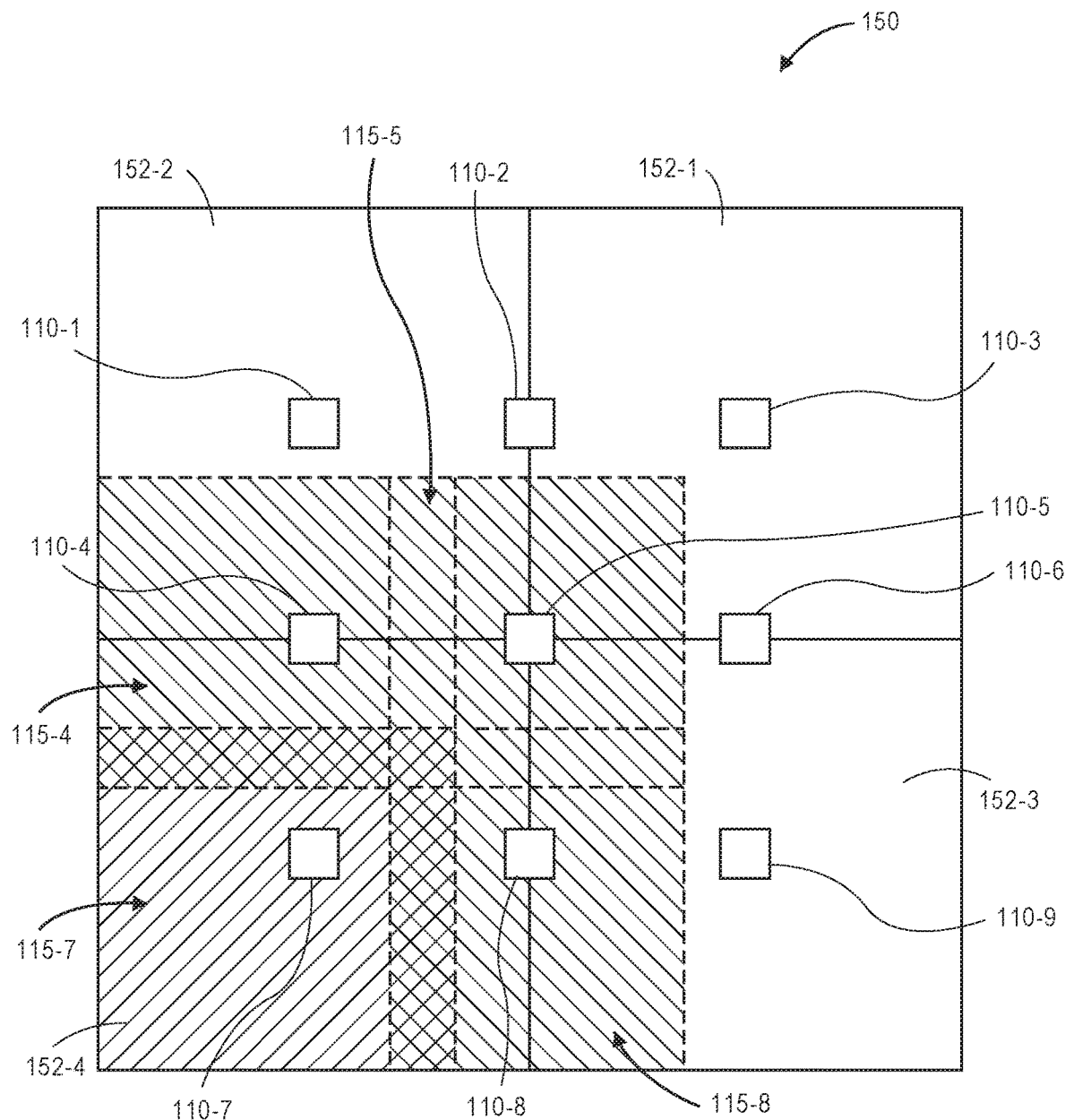

Upon determining that the time-of-flight camera 110-7 is experiencing depth interference with one or more of the other time-of-flight cameras 110-1, 110-2, 110-3, 110-4, 110-5, 110-6, 110-8, 110-9, such other time-of-flight cameras 110-1, 110-2, 110-3, 110-4, 110-5, 110-6, 110-8, 110-9 may be identified based on one or more extrinsic factors. For example, an interfering camera may be identified based on frequencies or time slots assigned to each of the time-of-flight cameras 110-1, 110-2, 110-3, 110-4, 110-5, 110-6, 110-7, 110-8, 110-9, based on time-of-flight cameras 110-1, 110-2, 110-3, 110-4, 110-5, 110-6, 110-8, 110-9 having an overlapping field of view 115-1, 115-2, 115-3, 115-4, 115-5, 115-6, 115-8, 115-9 with the field of view 115-7 of the time-of-flight camera 110-7, or based on times at which frequencies or time slots were assigned to each of the time-of-flight cameras 110-1, 110-2, 110-3, 110-4, 110-5, 110-6, 110-7, 110-8, 110-9. As is shown in FIG. 1G, a field of view 115-7 of the time-of-flight camera 110-7 includes at least the area of interest 152-4. Additionally, as is also shown in FIG. 1G, fields of view 115-4, 115-5, 115-8 of the time-of-flight cameras 110-4, 110-5, 110-8, respectively, also overlap at least in part the area of interest 152-4. Therefore, at least one of the time-of-flight cameras 110-4, 110-5, 110-8 may be potentially responsible for the depth interference with the time-of-flight camera 110-7.

Figure 1H:
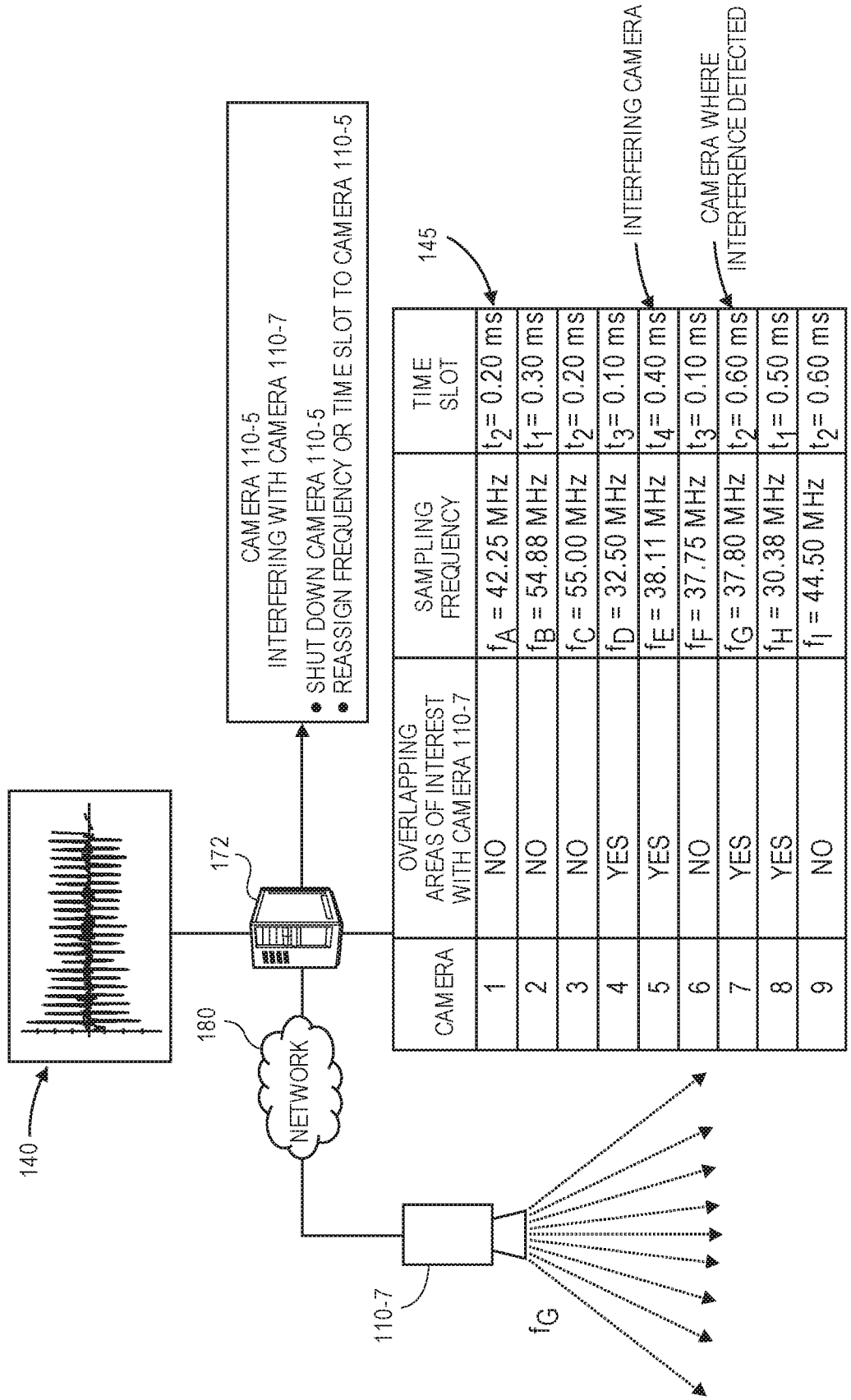

As is shown in FIG. 1H, the server 172 may determine that the time-of-flight camera 110-5 is responsible for the depth interference with the time-of-flight camera 110-7 based at least in part on the difference plot 140 and/or a record 145 of information regarding the time-of-flight cameras 110-1, 110-2, 110-3, 110-4, 110-5, 110-6, 110-7, 110-8, 110-9, including but not limited to whether one or more of such time-of-flight cameras 110-1, 110-2, 110-3, 110-4, 110-5, 110-6, 110-8, 110-9 has a field of view that overlaps with the field of view 115-7 of the time-of-flight camera 110-7. For example, the server 172 may determine that the area of interest 152-4 is within the field of view 115-7 of the time-of-flight camera 110-7, and may also determine that the area of interest 152-4 is also within the field of view 115-5 of the time-of-flight camera 110-5. The server 172 may further determine the discrete modulation frequencies or time slots for each of the time-of-flight cameras 110-1, 110-2, 110-3, 110-4, 110-5, 110-6, 110-7, 110-8, 110-9, and times at which such modulation frequencies or time slots were assigned to the time-of-flight cameras 110-1, 110-2, 110-3, 110-4, 110-5, 110-6, 110-7, 110-8, 110-9, and determine the time-of-flight camera 110-5 operates at a similar modulation frequency and/or within the same time slot as the time-of-flight camera 110-7, or that the time-of-flight camera 110-5 was assigned the modulation frequency and the time slot shortly before the interference was detected. Accordingly, the server 172 may elect to shut down the time-of-flight camera 110-5, or to program the time-of-flight camera 110-5 to operate at a different frequency or within a different time slot. Alternatively, the server 172 may elect to shut down the time-of-flight camera 110-7, to program the time-of-flight camera 110-7 to operate at a different frequency or within a different time slot, or to permit the time-of-flight camera 110-5 and the time-of-flight camera 110-7 to remain in operation, in their interfering state.

Accordingly, the systems and methods of the present disclosure may be used to detect depth interference among two or more imaging devices having overlapping fields of view that are configured to capture depth imaging data from a scene, e.g., a materials handling facility. The imaging devices may be specifically programmed at a discrete modulation frequency or to operate within a discrete time slot, and configured to capture depth imaging data (e.g., streams of depth images) from one or more areas of interest within the scene. Depth interference may be detected where a sufficient number of pixel values of one or more depth images captured using a time-of-flight camera have values of zero. Information or data regarding such pixel values, e.g., ratios or deviations between such ratios, may be graphed or plotted, and depth interference may be identified based on the graph or plot, such as where the graphed or plotted values are consistent with a specifically repeating waveform or shape, or where maximum or minimum values of such graphs or plots exceed one or more thresholds. For example, depth interference may be detected by comparing graphed or plotted values to a waveform of a graph or plot of ratios that is consistent with depth interference. Furthermore, where depth interference is detected within depth images captured by a first time-of-flight camera that is configured to capture depth images at a specific frequency or within a specific time slot, a second time-of-flight camera responsible for the interference may be detected based on one or more extrinsic factors.

A time-of-flight camera is an imaging device having an illuminator and a sensor that determines distances to each of a plurality of pixels corresponding to a portion of a scene within a field of view by illuminating the scene by the illuminator, e.g., a modulated light source, and capturing the reflected light by the sensor. The illuminator typically emits light (e.g., infrared or near-infrared light having a wavelength between seven hundred and one thousand nanometers, or 700-1000 nm) by way of a laser, a light-emitting diode (or "LED"), or another light source. The sensor may include an array of photodetectors or photosensitive components such as a charge coupled device ("CCD"), a complementary metal-oxide sensor ("CMOS"), photodiodes, or the like. The sensor may capture light reflected from objects on the scene and assign one or more quantitative values (e.g., distances or ranges to such objects) to aspects of the reflected light. In some implementations, the time-of-flight camera may be a discrete, standalone unit. In some other implementations, the time-of-flight camera may be integrally or functionally joined with a visual camera, e.g., a color camera (or RGB camera), a grayscale camera or a black-and-white camera.

In some implementations, a time-of-flight camera operates by illuminating a scene and determining a time required for light to travel from the illuminator to an individual photodetector of the sensor. A distance from the time-of-flight camera to each of the respective portions of a scene corresponding to one of the photodetectors may be determined as a function of the speed of light, or approximately 300 million meters per second (or $3.0 \times 10^8$ m/s). Because a time-of-flight camera may illuminate an entire field of view simultaneously, a time-of-flight camera may be used to generate depth images or profiles of the field of view quickly and efficiently from each illumination.

A time-of-flight camera may operate to illuminate a scene, or to capture light reflected from the scene, in any number of ways. For example, an illuminator of a time-of-flight camera may operate using one or more pulsed light sources. Pulsed modulation may be achieved by integrating photoelectrons from reflected light, or by counting light contact at a first detection of a reflection, e.g., by a single photon avalanche diode, or another type of sensor having any number of photoreceptors thereon. Electrical charges may be accumulated and measured by each of the photoreceptors, for each of the pulses, during windows that are in-phase and/or out-of-phase with the illumination. The measured electrical charges may be used to calculate distances to portions of the scene appearing within the field of view that correspond to such photoreceptors accordingly.

In some implementations, where a time-of-flight camera operates using a pulsed light source as an illuminator, each pulse may have a high period on the order of several nanoseconds. The pulsing may occur for various distinct periods of time, such as where pulses (on the order of thousands or tens of thousands) of pulse cycles occur for one period, and cease for another period, e.g., a pulse envelope. For example, where an illuminator is programmed to emit pulses for four hundred microseconds (400 µs), or four-tenths of one millisecond (0.400 ms), and to cease pulsing for eight hundred microseconds (800 µs), or eight-tenths of one microsecond (0.800 ms), a pulse envelope may have a duration of twelve hundred microseconds (1200 µs), or 1.2 microseconds (1.2 ms). Those of ordinary skill in the pertinent arts will realize that pulses may be emitted or ceased for any durations, and that pulse envelopes and repeated intervals may likewise have any durations. Additionally, any number of frames may likewise be captured at the repeated intervals, and for any durations.

Alternatively, or additionally, an illuminator of a time-of-flight camera may operate using a continuous wave light source which captures a number of samples at different phases with respect to the illumination. For example, a continuous wave time-of-flight camera may capture four samples, e.g., at four phases, each phase-stepped by ninety degrees (viz., zero, ninety, one hundred eighty or two hundred seventy degrees). The continuous waves may be illuminated at different modulation frequencies, thereby increasing a level of accuracy of depth images captured by the time-of-flight camera, or distances embodied in such depth images, accordingly. For example, a phase-shift of a signal, a signal strength and/or an offset (or a gray-scale value) may be calculated for each of the photoreceptors of a sensor, or pixels of a depth image, as a function of the electrical charge accumulated in each of the samples. A distance associated with each of the photoreceptors of the sensor, or pixels of the depth image (e.g., voxels) may be calculated as a function of the speed of light, the phase-shift and the modulation frequency. In some implementations, a continuous wave time-of-flight camera may operate at a pair of modulation frequencies, and may capture four sets of sensor data at each of the modulation frequencies, for a total of eight sets of sensor data.

Reflected light may be captured or detected by a time-of-flight camera if the reflected light is within the time-of-flight camera's field of view, which is defined as a function of a distance between a sensor and a lens within the time-of-flight camera, viz., a focal length, as well as a location of the time-of-flight camera and an angular orientation of the time-of-flight camera's lens. Accordingly, where an object appears within a depth of field, or a distance within the field of view where the clarity and focus is sufficiently sharp, a time-of-flight camera may capture light that is reflected off objects of any kind to a sufficiently high degree of resolution using one or more sensors thereof, and store information regarding the reflected light in one or more data files.

Many time-of-flight cameras also include manual or automatic features for modifying their respective fields of view or orientations. For example, a time-of-flight camera may be configured in a fixed position, or with a fixed focal length (e.g., fixed-focus lenses) or angular orientation. Alternatively, a time-of-flight camera may include one or more actuated or motorized features for adjusting a position of the time-of-flight camera, or for adjusting either the focal length (e.g., zooming the imaging device) or the angular orientation (e.g., the roll angle, the pitch angle or the yaw angle) of the time-of-flight camera, by causing a change in a distance between the sensor and the lens (e.g., optical zoom lenses or digital zoom lenses), a change in a location of the time-of-flight camera, or a change in one or more of the angles defining an angular orientation.

For example, a time-of-flight camera may be hard-mounted to a support or mounting that maintains the time-of-flight camera in a fixed configuration or angle with respect to one, two or three axes. Alternatively, however, a time-of-flight camera may be provided with one or more motors and/or controllers for manually or automatically operating one or more of the components, or for reorienting the axis or direction of the time-of-flight camera, i.e., by panning or tilting the time-of-flight camera. Panning a time-of-flight camera may cause a rotation within a horizontal plane or about a vertical axis (e.g., a yaw), while tilting a time-of-flight camera may cause a rotation within a vertical plane or about a horizontal axis (e.g., a pitch). Additionally, a time-of-flight camera may be rolled, or rotated about its axis of rotation, and within a plane that is perpendicular to the axis of rotation and substantially parallel to a field of view of the time-of-flight camera.

Figure 2A:
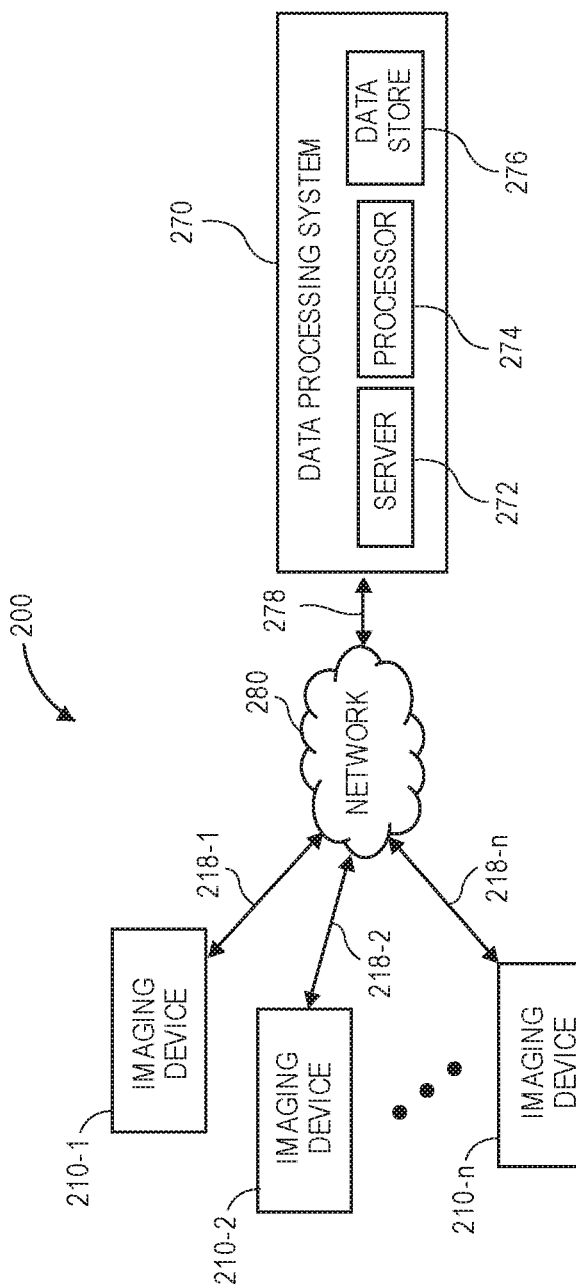
FIGS. 2A and 2B are block diagrams of one system for detecting interference in depth images captured using overlapping depth cameras in accordance with implementations of the present disclosure.
Figure 2B:
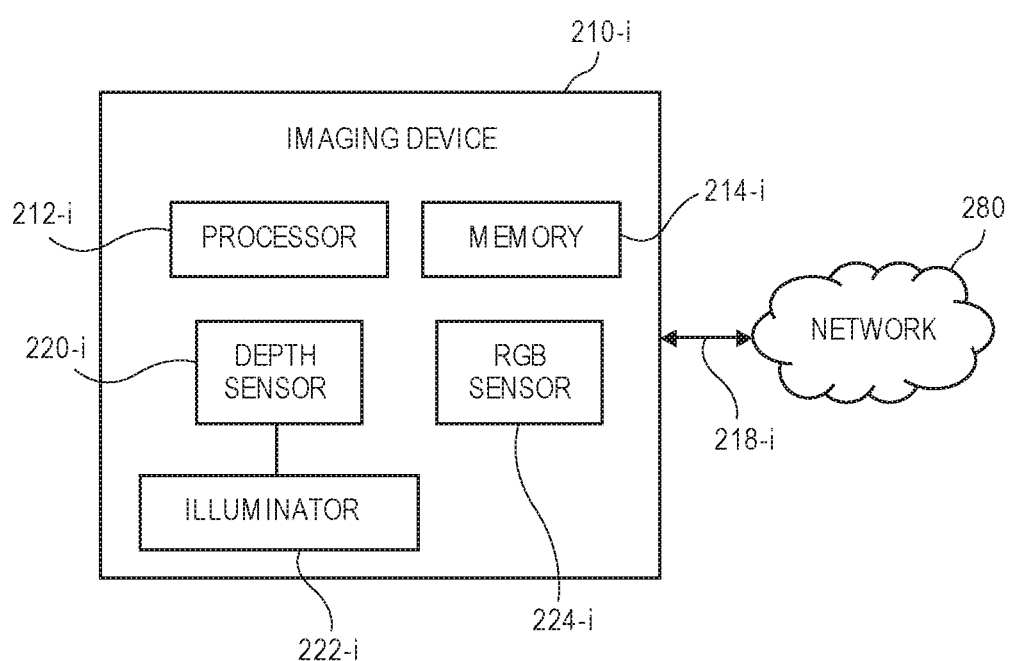

Referring to FIGS. 2A and 2B, a block diagram of one system 200 for detecting interference in depth images captured using overlapping depth cameras in accordance with implementations of the present disclosure is shown. The system 200 of FIGS. 2A and 2B includes a plurality of imaging devices 210-1, 210-2 . . . 210-n and a data processing system 270 that are connected to one another over a network 280, which may include the Internet, in whole or in part. Except where otherwise noted, reference numerals preceded by the number "2" shown in FIGS. 2A and 2B indicate components or features that are similar to components or features having reference numerals preceded by the number "1" shown in FIGS. 1A through 1H.

The imaging devices 210-1, 210-2 . . . 210-n may be any form of optical recording devices that may be used to photograph or otherwise record imaging data of any kind from structures, facilities, terrain or any other elements appearing within their respective fields of view, which may include all or any portions of any type or form of scene, e.g., one or more portions of a materials handling facility. The imaging devices 210-1, 210-2 . . . 210-n may include one or more sensors, memory or storage components and processors, and such sensors, memory components or processors may further include one or more photosensitive surfaces, filters, chips, electrodes, clocks, boards, timers, power sources, connectors or any other relevant features (not shown). Such imaging devices 210-1, 210-2 . . . 210-n may capture imaging data in the form of one or more still or moving images of any kind or form, as well as any relevant audio signals or other information. The imaging devices 210-1, 210-2 . . . 210-n may also be adapted or otherwise configured to communicate with the data processing system 270 by way of the network 280.

Each of the imaging devices 210-1, 210-2 . . . 210-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 210-i includes one or more optical sensors, including one or more depth sensors 220-i, one or more illuminators 222-i and one or more RGB sensors 224-i (or grayscale sensors or black-and-white sensors) that are configured to capture visual imaging data (e.g., textures) or depth imaging data (e.g., ranges) to objects within one or more fields of view of the imaging device 210-i.

The depth sensors 220-i and the RGB sensors 224-i may be any sensors having single elements or a plurality of photoreceptors or photosensitive components (e.g., a CCD sensor, a CMOS sensor, or another sensor), which may be typically arranged in an array. Light reflected from objects within a field of view of the imaging device 210-i may be captured by the depth sensors 220-i and the RGB sensors 224-i, and quantitative values, e.g., pixels, may be assigned to one or more aspects of the reflected light. The illuminators 222-i may be any system such as a laser system or a light-emitting diode (or "LED") for illuminating a portion of a scene appearing within a field of view of the imaging device 210-i, e.g., by infrared or near-infrared light, such as light with wavelengths ranging from approximately seven hundred to approximately one thousand nanometers (700-1000 nm). Alternatively, the illuminators 222-i may illuminate all or portions of the scene with light at any wavelengths.

The imaging device 210-i further includes one or more processors 212-i and one or more memory components 214-i, and any other components (not shown) that may be required in order to capture, analyze and/or store imaging data. For example, the imaging device 210-i may capture one or more still or moving images (e.g., streams of visual and/or depth image frames), along with any relevant audio signals or other information (e.g., position data), and may also connect to or otherwise communicate with the server 272, or any other computer devices over the network 280, through the sending and receiving of digital data. In some implementations, the imaging device 210-i may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the network 280 directly. The processors 212-i may be configured to process imaging data captured by one or more of the depth sensors 220-i or the RGB sensors 224-i. For example, in some implementations, the processors 212-i may be configured to execute any type or form of machine learning algorithm or technique, e.g., an artificial neural network.

The imaging devices 210-1, 210-2 . . . 210-n may be homogenous or heterogeneous in nature, in accordance with the present disclosure. For example, one or more of the imaging devices 210-1, 210-2 . . . 210-n may have both the depth sensor 220-i and the RGB sensor 224-i. Alternatively, one or more of the imaging devices 210-1, 210-2 . . . 210-n may have just a depth sensor 220-i or just an RGB sensor 224-i (or grayscale sensor or black-and-white sensor). For example, one or more of the imaging devices 210-1, 210-2 . . . 210-n may be an RGB color camera, a still camera, a motion capture/video camera or any other type or form of camera. In other implementations, one or more of the imaging devices 210-1, 210-2 . . . 210-n may be depth-sensing cameras, such as an RGBz or RGBD camera. In still other implementations, one or more of the imaging devices 210-1, 210-2 . . . 210-n may be a thermographic or infrared (IR) camera. Additionally, in some implementations, the imaging devices 210-1, 210-2 . . . 210-n may simply be camera modules that include a lens and an image sensor configured to convert an optical image obtained using the lens of the camera into a digital signal or digital representation of the image (generally referred to herein as imaging data).

The imaging devices 210-1, 210-2 . . . 210-n may also include manual or automatic features for modifying their respective fields of view or orientations. For example, one or more of the imaging devices 210-1, 210-2 . . . 210-n may be configured in a fixed position, or with a fixed focal length (e.g., fixed-focus lenses) or angular orientation. Alternatively, one or more of the imaging devices 210-1, 210-2 . . . 210-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 210-1, 210-2 . . . 210-n, or changes in one or more of the angles defining the angular orientation.

For example, one or more of the imaging devices 210-1, 210-2 . . . 210-n may be hard-mounted to a support or mounting that maintains the device in a fixed configuration or angle with respect to one, two or three axes. Alternatively, however, one or more of the imaging devices 210-1, 210-2 . . . 210-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 210-1, 210-2 . . . 210-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Although the system 200 of FIG. 2A includes boxes corresponding to three imaging devices 210-1, 210-2 . . . 210-n, those of ordinary skill in the pertinent arts will recognize that any number or type of imaging devices may be operated in accordance with the present disclosure, including but not limited to digital cameras, depth sensors or range cameras, infrared cameras, radiographic cameras or other devices having one or more optical sensors. In some implementations, the system 200 may include dozens or even hundreds of imaging devices of any type or form.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2A may be independently provided for the exclusive purpose of receiving, analyzing or storing imaging data or other information or data received from the imaging devices 210-1, 210-2 . . . 210-n or, alternatively, provided in connection with one or more physical or virtual services configured to receive, analyze or store such imaging data or other information or data, as well as one or more other functions. In some implementations, the data processing system 270 may be associated with a materials handling facility, or any other physical or virtual facility.

The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the imaging devices 210-1, 210-2 . . . 210-n, or from one or more other external computer systems (not shown) via the network 280. In some implementations, the data processing system 270 may be provided in a physical location. In other such implementations, the data processing system 270 may be provided in one or more alternate or virtual locations, e.g., in a "cloud"-based environment. In still other implementations, the data processing system 270 may be provided onboard one or more vehicles, e.g., an unmanned aerial vehicle.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some implementations, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The imaging devices 210-1, 210-2 . . . 210-n and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the imaging devices 210-1, 210-2 . . . 210-*n* may be adapted to transmit information or data in the form of synchronous or asynchronous messages to the data processing system 270 or to any other computer device in real time or in near-real time, or in one or more offline processes, via the network 280. Those of ordinary skill in the pertinent art would recognize that the imaging devices 210-1, 210-2 . . . 210-*n* or the data processing system 270 may operate or be operated by any of a number of computing devices that are capable of communicating over the network, including but not limited to set-top boxes, personal digital assistants, digital media players, mobile devices, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212-*i* or the processor 274, or any other computers or control systems utilized by the imaging devices 210-1, 210-2 . . . 210-*n* or the data processing system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Some implementations of the present disclosure may include time-of-flight cameras, e.g., depth cameras, that are mounted in fixed or movable positions or orientations with respect to a scene from which depth information or data is sought. In some implementations, such scenes may include or be associated with one or more portions of a materials handling facility. As is used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. Alternatively, time-of-flight cameras may be mounted in fixed or movable positions or orientations with respect to any other type of scene, including but not limited to transportation centers, financial centers, or any other facilities. As is used herein, a "time-of-flight camera" is an imaging device that is configured to resolve distances (e.g., ranges or depths) to objects within a field of view by transmitting pulses of light, receiving reflections of the pulses of light, and calculating ranges to such objects based on the time-of-flight of the pulses of light between the imaging device and such objects and the speed of light.

Figure 3:
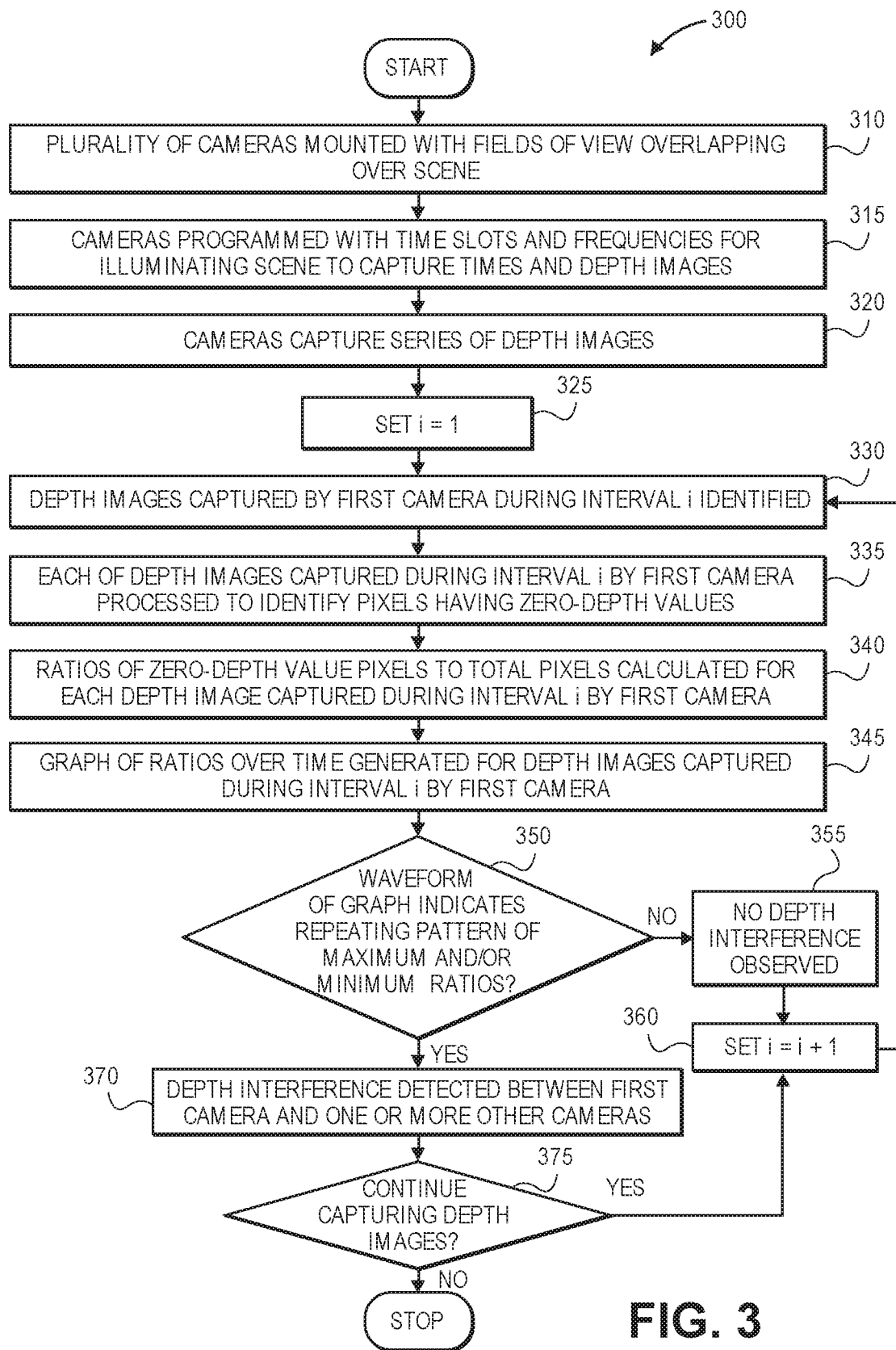
FIG. 3 is a flow chart of one process for detecting interference in depth images captured using overlapping depth cameras in accordance with implementations of the present disclosure.

As is discussed above, some implementations of the present disclosure are directed to detecting interference within depth images based on plots, graphs or other representations of ratios of zero-value depth pixels within such images. Referring to FIG. 3, a flow chart 300 of one process for detecting interference in depth images captured using overlapping depth cameras in accordance with implementations of the present disclosure is shown. At box 310, a plurality of depth cameras are mounted with fields of view overlapping over a scene having any number of areas of interest. In some implementations, time-of-flight cameras or other depth cameras may be mounted within a materials handling facility, and the scene may include all or portions of such areas where one or more persons or objects may be expected to be present. At box 315, each of the cameras is programmed with a discrete time slot and a discrete modulation frequency for illuminating the scene and capturing depth images. For example, each of the cameras may be programmed with a unique modulation frequency at which the respective cameras are to project modulated infrared light pulses onto the scene, within a discrete time slot, and to expose their respective sensors to capture light reflected therefrom as a result of such pulses. At box 320, the cameras capture a series of depth images from the scene, e.g., in response to the light pulses projected thereon in accordance with each of their assigned frequencies and within their assigned time slots, and at any image rate (or frame rate), e.g., ten frames per second, fifteen frames per second, thirty frames per second, or at any other image rate (or frame rate), in a streaming manner.

At box 325, a value of a step variable i is set equal to one, or i=1. At box 330, depth images captured by a first camera during the interval i are identified. The number of depth images may be determined based on a product of a length of time of the interval and an image rate (or frame rate) of the first camera. For example, where the interval i is ten seconds in duration, the number of depth images captured at a frame rate of thirty frames per second, or every 33.3 milliseconds, is three hundred frames.

At box 335, each of the depth images captured within the interval i is processed to identify pixels having zero-depth values. For example, as is discussed above, where the first camera is installed with a number of fixed structures and a number of active areas of interest within their respective fields of view, the depth images may be expected to have substantially constant values with respect to the fixed structures and variable values with respect to the areas of interest, e.g., due to any foot traffic, vehicle traffic or other activity occurring within such areas when the first camera is not experiencing any depth interference with one or more other cameras, such as when each of the cameras that overlap with one another is programmed to operate at different frequencies or at different times, e.g., within different time slots of a repeated period. As is discussed above, however, where the first camera overlaps with one or more other cameras, and one or more of such cameras operates at the same modulation frequency and within the same time slot as the first camera, interference in the form of zero-depth values of one or more pixels may be detected within one or more of the depth images despite the fact that distances associated with such pixels are greater than zero.

At box 340, ratios of the numbers of zero-depth pixels to total numbers of pixels within each depth image are calculated. For example, where a depth image having dimensions of eight hundred (or 800) pixels by six hundred (or 600) pixels includes fifty thousand (or 50,000) pixels having zero-depth values, the ratio of zero-depth pixels to the total number of pixels within the depth image, viz., four hundred eighty thousand (or 480,000) pixels, is approximately 0.104, or 10.4 percent. Such ratios may be calculated for each of the depth images captured during the interval i. At box 345, a graph of the ratios calculated at box 340 is generated for each of the depth images captured during the interval i by the first camera. In some implementations, the graph may include, along a y-axis (or ordinate), values corresponding to numbers of zero-value pixels within each of the depth images, or percentages (or portions or shares) of the depth images that include zero-value pixels. Along an x-axis (or abscissa), the graph may include times at which such images were captured within the interval, or a serial number of depth images within the interval. Alternatively, in some implementations, any other measure of a share or portion of a given depth image that have values of zero may be plotted along they-axis. For example, in some implementations, the plot may be a difference plot indicating an extent to which a number of zero-value pixels within one depth image (or a percentage of the depth image that is not zero) deviates from a number of zero-value pixels within another depth image (or a percentage of the other depth image that is not zero), e.g., a preceding or a succeeding depth image.

At box 350, whether a waveform of the graph indicates a repeating pattern of maximum and minimum values of the ratios of zero-value pixels to total pixels is determined. For example, in some implementations, where the graph is a difference graph indicating an extent to which a number of depth pixels within a depth image that have values of zero, or a percentage of the depth image that has zero-value pixels, is different (or deviates) from a number of depth pixels within a preceding or following depth image that have values of zero, or a percentage of the preceding or following depth image that has zero-value pixels, the first camera may be determined to be subject to interference by one or more other cameras if a plurality of maximum and minimum values repeatedly appear at discrete locations within the graph, such variations may indicate the presence of depth interference within imaging data captured using the first camera. Any other manner for depicting the extent to which a depth image includes zero-value pixels, or for comparing zero-value portions of depth images to one another, or for otherwise detecting the presence of depth interference within depth images, may be utilized in accordance with the present disclosure.

If a waveform of the graph does not indicate a repeating pattern of maximum and minimum values of ratios of zero-value pixels to total pixels, or otherwise fails to indicate that the first camera is observing depth interference, then the process advances to box 355, where an indication that the first camera is not observing depth interference may be stored in one or more data stores. The process then advances to box 360, where the value of the step variable i is incremented by one, or where i is set to equal i+1, before returning to box 330, where depth images captured by the first camera during a next interval i are identified. The next interval i may include some of the depth images that were included in the previous interval, or need not include any of such images.

If the waveform of the graph indicates a repeating pattern of maximum and minimum values of ratios of zero-depth pixels to total pixels, or otherwise indicates that the first camera is observing depth interference based on numbers or ratios of zero-depth pixels in excess of one or more thresholds, e.g., that one or more other depth cameras having overlapping fields of view is operating at the same discrete modulation frequency or within the same time slot, then the process advances to box 370, where an indication that the first camera is observing depth interference with one or more other cameras may be stored in one or more data stores. The process then advances to box 375, where whether the continued capture of depth images is desired is determined. For example, the first camera may be shut down, or reprogrammed with one or more modulation frequencies or time slots. Alternatively, one or more other manual or automatic steps may be taken, as necessary or desired, in order to address the depth interference. If the continued capture of depth images is desired, then the process advances to box 360, where the value of the step variable i is incremented by one, or where i is set to equal i+1, before returning to box 330, where depth images captured by the first camera during a next interval i are identified. If the continued capture of depth images is no longer desired, the process ends.

Figure 4A:
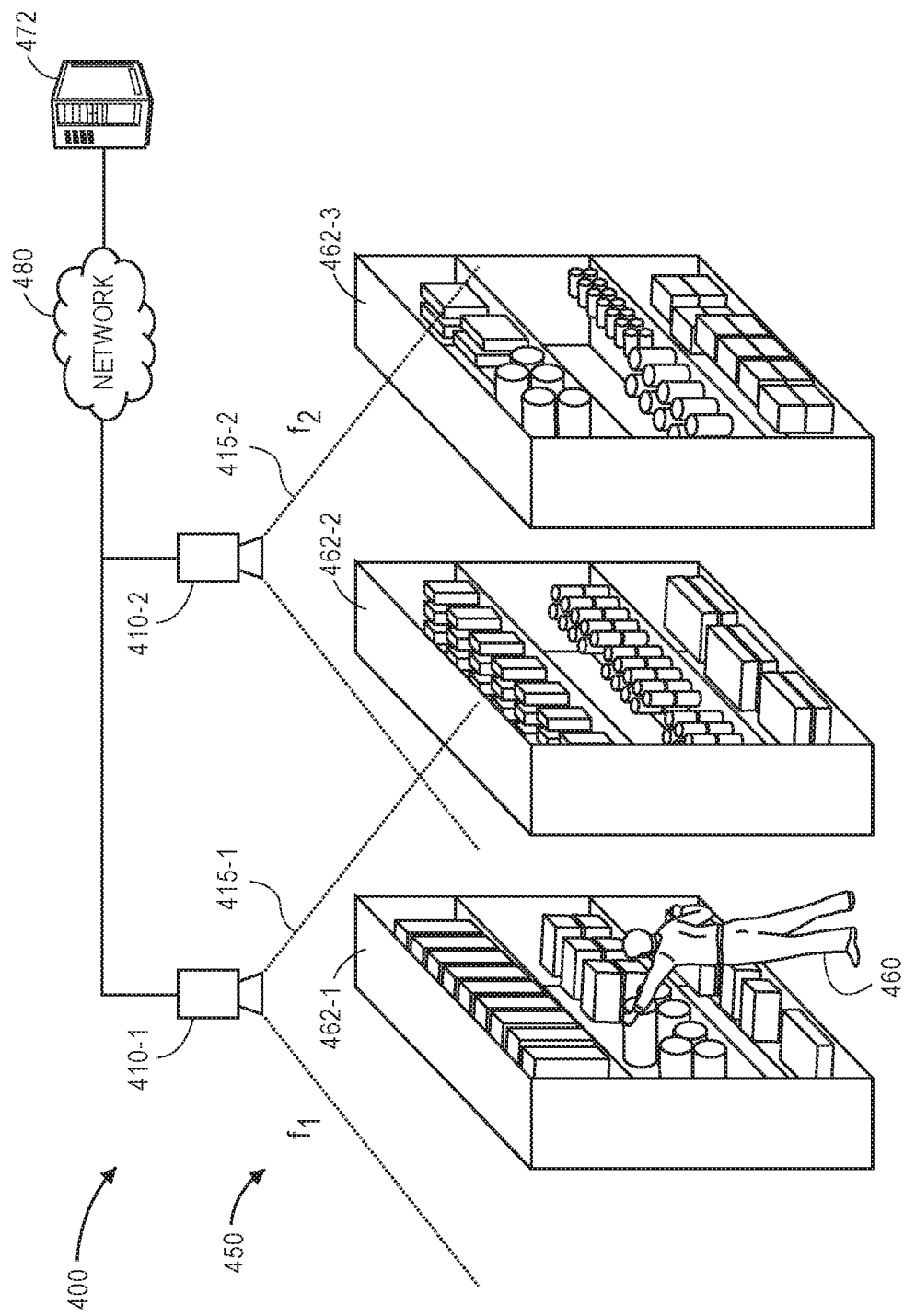
Figure 4B:
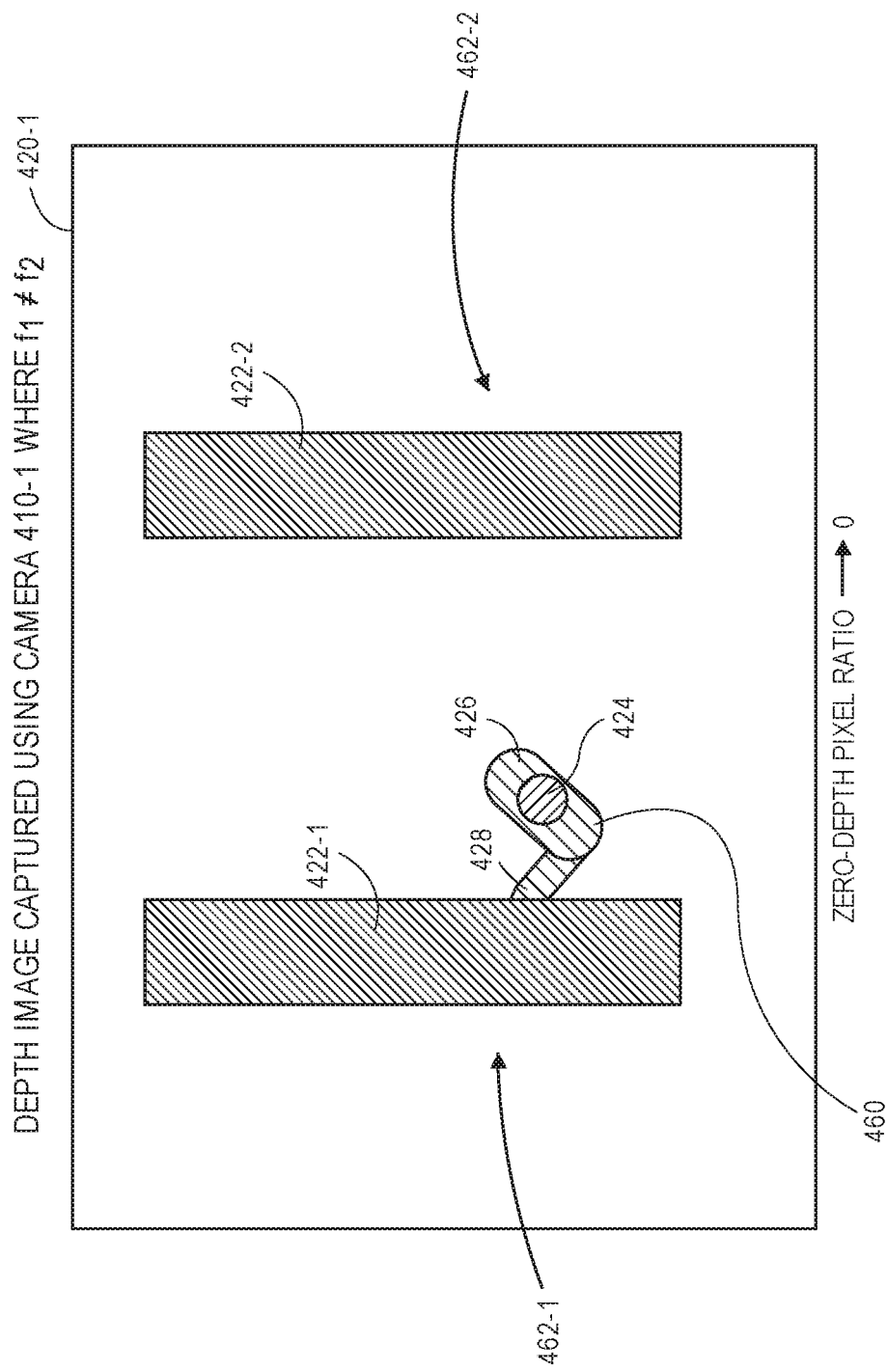

As is discussed above, depth interference may be detected within depth images captured by a time-of-flight camera or other imaging device operating at a specific modulation frequency or within a specific time slot where another time-of-flight camera is also operating at the same modulation frequency or within the same time slot. Referring to FIGS. 4A through 4C, views of aspects of one system for detecting interference in depth images captured using overlapping depth cameras in accordance with implementations of the present disclosure are shown. Except where otherwise noted, reference numerals preceded by the number "4" shown in FIGS. 4A through 4C indicate components or features that are similar to components or features having reference numerals preceded by the number "2" shown in FIGS. 2A and 2B or by the number "1" shown in FIGS. 1A through 1H.

As is shown in FIG. 4A, a system 400 includes a pair of time-of-flight cameras 410-1, 410-2 that are mounted in association with a facility 450 (e.g., a materials handling facility). The time-of-flight cameras 410-1, 410-2 have fields of view 415-1, 415-2 that overlap over the facility 450, which includes a person 460 (e.g., a worker, a customer, or another person) and a plurality of structures 462-1, 462-2, 462-3 (e.g., shelving units). As is shown in FIG. 4A, the person 460 extends an arm or other limb or feature toward the structure 462-1. As is also shown in FIG. 4A, each of the time-of-flight cameras 410-1, 410-2 is configured to capture depth images at a discrete frequency of operation $f_1$, $f_2$ and within a discrete time slot $t_1$, $t_2$. Alternatively, or additionally, the facility 450 may further include one or more machines, e.g., autonomous mobile robots (not shown).

As is shown in FIG. 4B, a depth image 420-1 captured using the time-of-flight camera 410-1 is shown, where the frequency of operation $f_1$ of the time-of-flight camera 410-1 is not equal to the frequency of operation $f_2$ of the time-of-flight camera 410-2, and where the time slot $t_1$ does not overlap the time slot $t_2$. The depth image 420-1 includes a plurality of pixel values indicative of ranges to aspects of the person 460, including a set of pixel values 422-1, 422-2 corresponding to the structures 462-1, 462-2. The depth image 420-1 further includes a set of pixel values 424 corresponding to a head of the person 460, a set of pixel values 426 corresponding to shoulders of the person 460 and a set of pixel values 428 corresponding to an arm of the person 460.

As is shown in FIG. 4C, a depth image 420-2 captured using the time-of-flight camera 410-1 is shown, where the frequency of operation $f_1$ of the time-of-flight camera 410-1 equals the frequency of operation $f_1$ of the time-of-flight camera 410-2, or where the time slot $t_1$ overlaps the time slot $t_2$. The depth image 420-1 includes portions of the same sets of pixel values 422-1, 422-2 corresponding to the structures 462-1, 462-2, as well as the set of pixel values 424 corresponding to the head of the person 460, the set of pixel values 426 corresponding to the shoulders of the person 460 and the set of pixels 428 corresponding to the arm of the person 460. The depth image 420-2 further includes a plurality of pixel values that are approximately zero, including sets of pixel values 430-1, 430-2, 430-3 in locations within the depth image 420-2 that have no bearing or relationship to any persons or objects present within the facility 450, e.g., one or more of the structures 462-1, 462-2, or one or more portions of the person 460. The sets of pixel values 430-1, 430-2, 430-3 occupy substantial portions of the depth image 420-2, and render the depth image 420-2 substantially ineffective as a representation of ranges to objects within the field of view 415-1 of the time-of-flight camera 410-1. For example, as is shown in FIG. 4C, one or more of the sets of pixel values 430-1, 430-2, 430-3 are substantially parallel to the set of pixels 428 corresponding to the arm of the person 460, thus obscuring the representations of depths or ranges to the structures 462-1, 462-2, or the head, the shoulders or the arm of the person 460, or other aspects depicted within the depth images 420-2.

Figure 5:
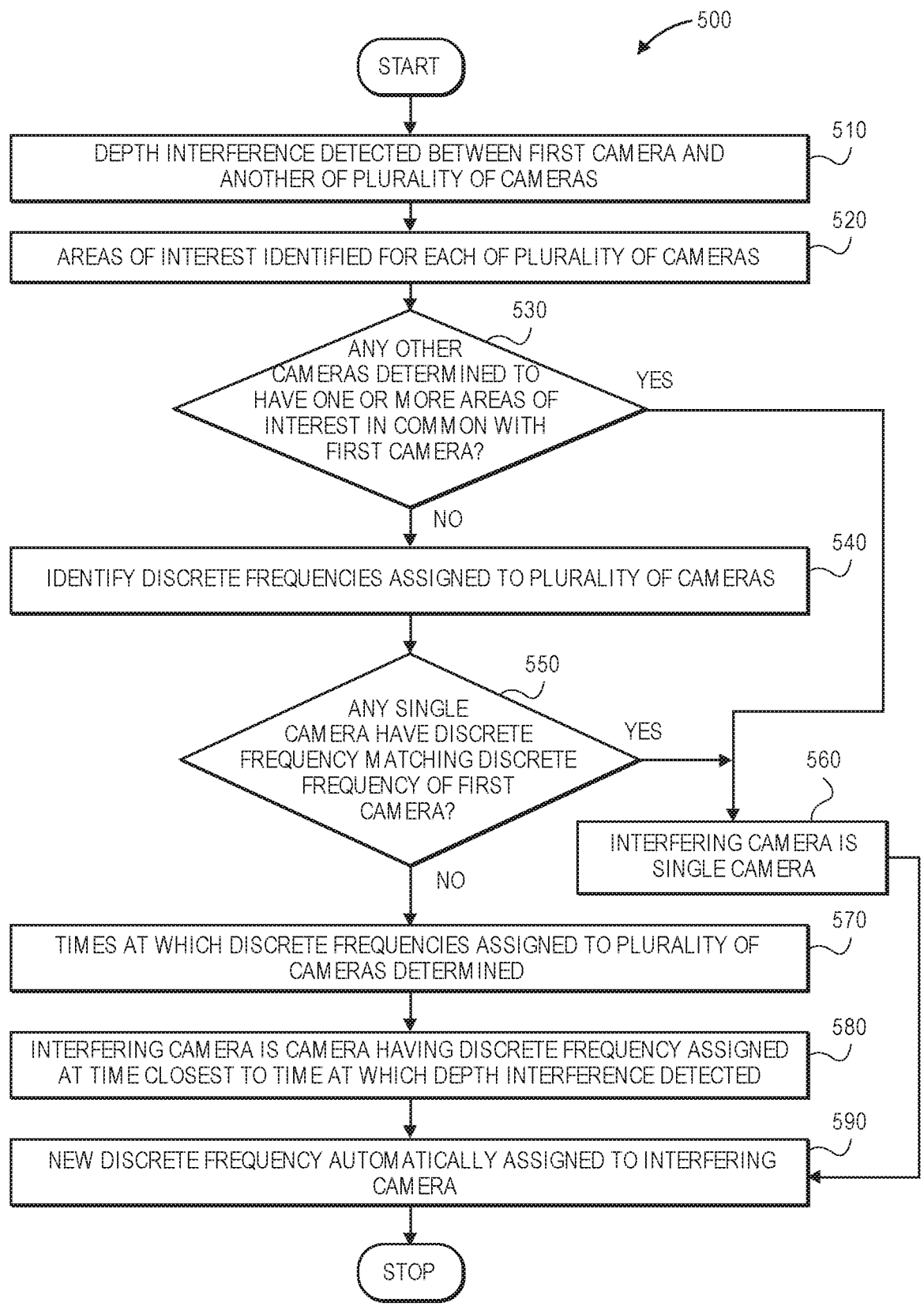
FIG. 5 is a flow chart of one process for detecting interference in depth images captured using overlapping depth cameras in accordance with implementations of the present disclosure.

As is also discussed above, when a time-of-flight camera or other imaging device is determined to be experiencing depth interference, one or more other time-of-flight cameras or imaging devices that are causing the depth interference, e.g., by operating at the same discrete frequency when illuminating a scene, may be identified. Referring to FIG. 5, a flow chart 500 of one process for detecting depth interference in depth images captured using overlapping depth cameras in accordance with implementations of the present disclosure is shown. At box 510, depth interference is detected between a first camera of a plurality of cameras, and at least another one of the plurality of cameras. For example, as is discussed above, that a first camera is experiencing depth interference may be determined where portions of depth images have disproportionately high numbers or ratios of zero-value pixels, or disproportionately high percentages of the depth images have values that are zero, or in any other manner, e.g., including but not limited to a graph or plot (e.g., a difference plot) depicting disproportionately high numbers, ratios or percentages of zero-value pixels, such as is shown in FIG. 1F.

At box 520, areas of interest of each of the plurality of cameras are identified, e.g., in one or more records maintained in a data store. At box 530, whether any other cameras are determined to have one or more areas of interest within their fields of view that are also within a field of view of the first camera common with the first camera is determined. For example, because depth interference occurs when light emitted by one time-of-flight camera is captured by another time-of-flight camera, the cameras must have overlapping fields of view in order for depth interference to occur. Therefore, where information or data regarding areas of interest within fields of view of cameras is maintained in one or more data stores, cameras that may have caused the depth interference with the first camera may be identified by determining which of such cameras includes one or more of the same areas of interest as the first camera within their respective fields of view.

If a single camera has an area of interest in common with the first camera, then the process advances to box 560, where the interfering camera is identified as the single camera having the area of interest in common with the first camera. If only one of the plurality of cameras has a field of view overlapping with a field of view of the first camera, viz., only one camera shares an area of interest with the first camera, then the interference may have been caused only by the one camera.

If no single camera has an area of interest in common with the first camera, then the process advances to box 540, where discrete frequencies and time slots that are assigned to the plurality of cameras are identified. For example, one or more records maintained in a data store may include information regarding the specific frequencies and time slots that have been manually or automatically assigned to each of the plurality of cameras, either independently or in one or more batch processes. At box 550, whether the record indicates that one single camera has a discrete frequency or time slot that matches the discrete frequency or time slot of the first camera is determined. If only one other camera is operating at the frequency of the first camera, or with the time slot of the first camera, then the process advances to box 560, where the interfering camera is identified as the single camera having the frequency or time slot of the first camera. If two of the plurality of cameras operate at a common frequency or during a common time slot, viz., the first camera and the other of the two cameras, then the depth interference may have been caused by just the other of the two cameras.

If no single camera is operating at the same discrete frequency or within the same time slot as the first camera, then the process advances to box 570, where times at which the discrete frequencies were assigned to the plurality of cameras are determined. At box 580, the interfering camera is identified as the camera that had its frequency or time slot assigned at a time closest to the time at which the depth interference was detected.

At box 590, a new discrete frequency and/or time slot is automatically assigned to the interfering camera, and the process ends. Alternatively, in some implementations, a new discrete frequency or time slot may be assigned to the first camera, or one or both of the first camera and the interfering camera may be shut down. In some other implementations, the cameras may be continued to remain in operation, despite the depth interference between the cameras.

Figure 6A:
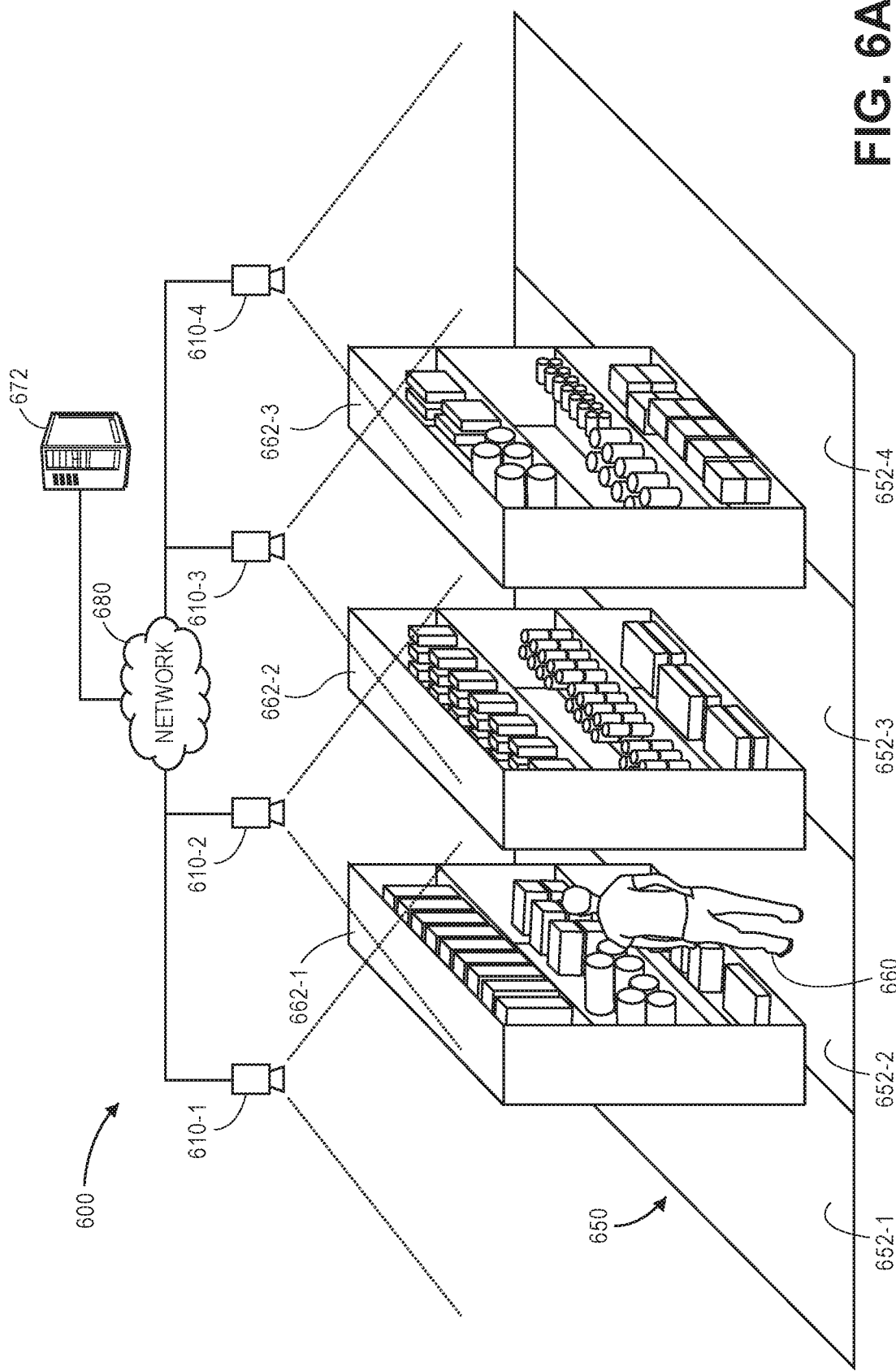
FIGS. 6A through 6C are views of aspects of one system for detecting interference in depth images captured using overlapping depth cameras in accordance with implementations of the present disclosure.
Figure 6B:
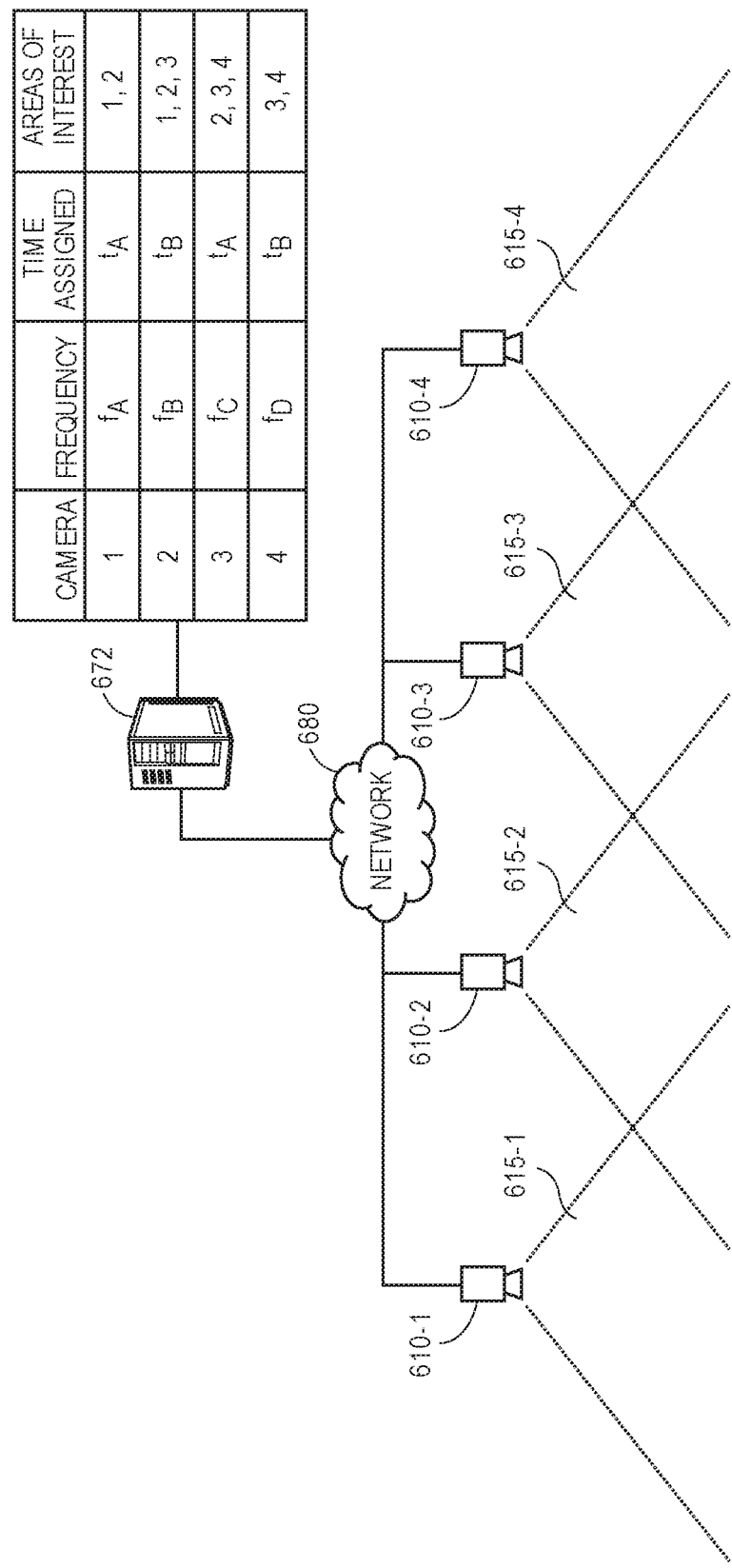
Figure 6C:
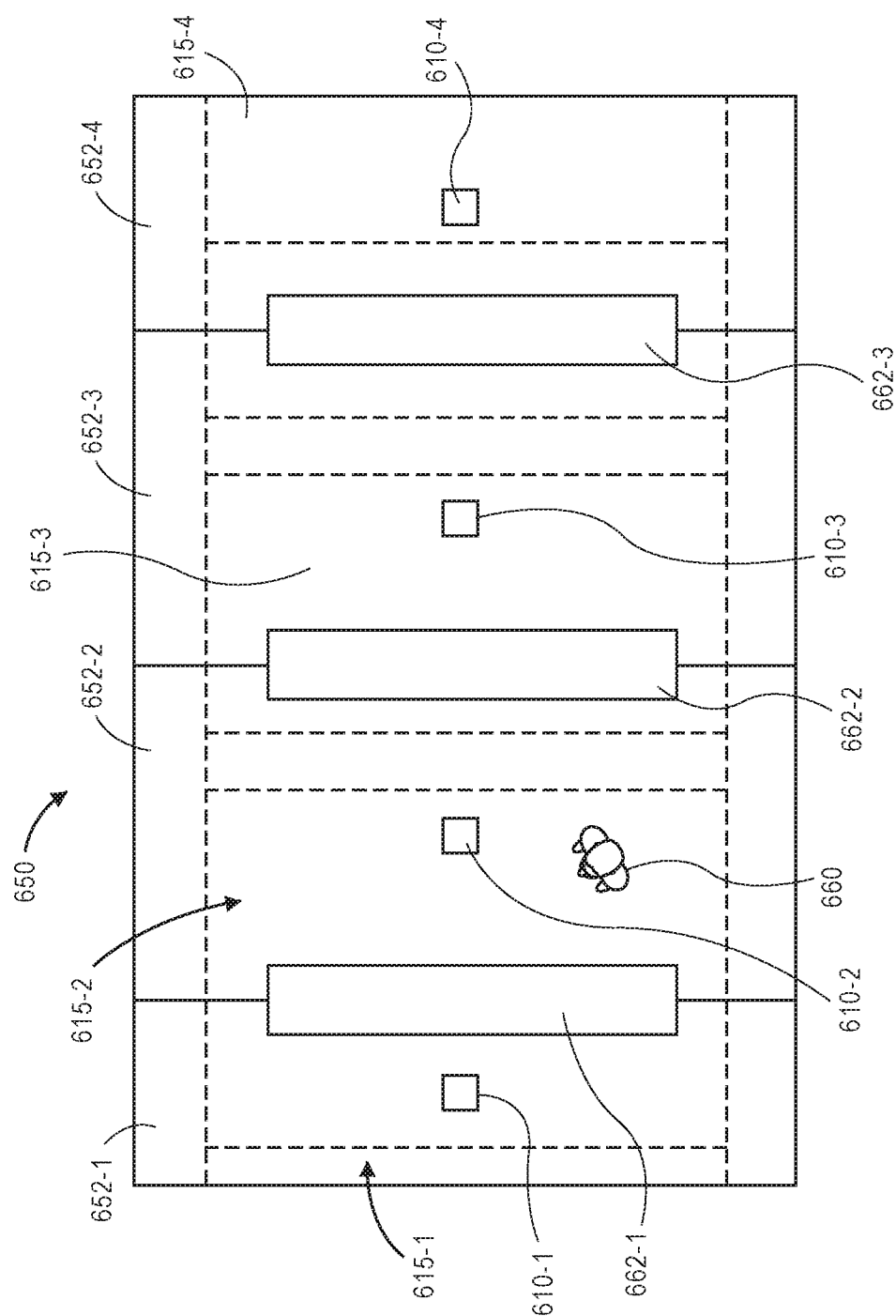

As is also discussed above, one or more time-of-flight cameras may be identified as interfering with another time-of-flight camera where such cameras are determined to be configured to capture depth imaging data at the same frequencies of operation, where such cameras are aligned to capture depth imaging data from common areas of interest, or where one or more of such cameras has been configured to capture imaging data at a selected frequency at a latest time prior to a time at which the depth interference is detected. Referring to FIGS. 6A through 6C, views of aspects of one system for detecting interference in depth images captured using overlapping depth cameras in accordance with implementations of the present disclosure are shown. Except where otherwise noted, reference numerals preceded by the number "4" shown in FIGS. 4A through 4C indicate components or features that are similar to components or features having reference numerals preceded by the number "4" shown in FIGS. 4A through 4C, by the number "2" shown in FIGS. 2A and 2B or by the number "1" shown in FIGS. 1A through 1H.

As is shown in FIG. 6A, the system 600 includes a plurality of time-of-flight cameras 610-1, 610-2, 610-3, 610-4 that are mounted in association with a facility 650 (e.g., a materials handling facility) having a plurality of areas of interest 652-1, 652-2, 652-3, 652-4. The time-of-flight cameras 610-1, 610-2, 610-3, 610-4 are connected to one another and to a server 672 over a network 680.

As is also shown in FIG. 6A, the system 600 further includes a person 660 (e.g., a worker, a customer or another person) and a plurality of structures 662-1, 662-2, 662-3 (e.g., shelving units). The plurality of areas of interest 652-1, 652-2, 652-3, 652-4 include portions of the facility 650 between or on either end of the respective structures 662-1, 662-2, 662-3.

As is shown in FIG. 6B, a record 645 of the frequencies of operation $f_A$, $f_B$, $f_C$, $f_D$ of the respective time-of-flight cameras 610-1, 610-2, 610-3, 610-4, the time slots $t_A$, $t_B$ assigned to the respective time-of-flight cameras 610-1, 610-2, 610-3, 610-4, and the areas of interest 652-1, 652-2, 652-3, 652-4 of the facility 650 that appear within the respective fields of view 615-1, 615-2, 615-3, 615-4 of the respective time-of-flight cameras 610-1, 610-2, 610-3, 610-4 is maintained on the server 672. As is shown in FIG. 6C, the fields of view 615-1, 615-2, 615-3, 615-4 overlap over one or more of the areas of interest 652-1, 652-2, 652-3, 652-4, such that the record 645 may be relied upon as a source of information or data when depth interference is detected within imaging data captured using one or more of the time-of-flight cameras 610-1, 610-2, 610-3, 610-4, e.g., to identify one or more other cameras responsible for the interference. For example, because the fields of view 615-1, 615-2, 615-3 overlap over the area of interest 652-2, where depth interference is detected within depth images captured using any of the time-of-flight cameras 610-1, 610-2, 610-3, 610-4, any of the other imaging devices that also include the area of interest 652-2 within their respective fields of view may be determined to be responsible for the depth interference. Likewise, because the time-of-flight cameras 610-1, 610-3 operate in a common time slot $t_A$, and because the time-of-flight cameras 610-2, 610-4 operate in a common time slot $t_B$, where depth interference is detected within depth images captured using any of the time-of-flight cameras 610-1, 610-2, 610-3, 610-4, another of the other imaging devices that also operates within a common time slot may be determined to be responsible for the depth interference Although some of the implementations disclosed herein reference the use of time-of-flight cameras in materials handling facilities or like environments, those of ordinary skill in the pertinent arts will recognize that the systems and methods disclosed herein are not so limited, and may be utilized in connection with time-of-flight cameras that are provided with overlapping fields of view for any intended industrial, commercial, recreational or other use in accordance with implementations of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow chart of FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A facility comprising:
a first time-of-flight camera having a first illuminator and a first sensor, wherein the first time-of-flight camera has a first field of view;
a second time-of-flight camera having a second illuminator and a second sensor, wherein the second time-of-flight camera has a second field of view; and
a server in communication with each of the first time-of-flight camera and the second time-of-flight camera,
wherein the server is configured to execute a method comprising:
programming the first time-of-flight camera to capture depth images by illuminating at least a portion of the facility at a first frequency or during a first time slot;
illuminating, by the first time-of-flight camera, the portion of the facility at the first frequency or during the first time slot;
capturing a plurality of depth images by the first time-of-flight camera at the first frequency or during the first time slot;
calculating, for each of a subset of the plurality of depth images, a ratio of a number of depth image pixels having a zero value to a total number of depth image pixels;
generating a plot based at least in part on the ratios calculated for each of the subset of the plurality of depth images;
determining, based at least in part on the plot, that the first time-of-flight camera is experiencing depth interference; and
in response to determining that the first time-of-flight camera is experiencing depth interference,
programming the second time-of-flight camera to capture depth images by illuminating at least the portion of the scene at a second frequency or during a second time slot,
wherein the second frequency is not the first frequency, and
wherein the second time slot is not the first time slot.

2. The facility of claim 1, wherein the plot is a difference plot comprising differences between ratios calculated for successively captured pairs of the first plurality of depth images on a first axis and times of capture for the first plurality of depth images on a second axis, and
wherein determining that the first time-of-flight camera is experiencing depth interference comprises:
determining that a waveform of the plot corresponds to depth interference.

3. The facility of claim 1, further comprising a working surface having a plurality of areas of interest, and
wherein the method further comprises:
determining that the first field of view includes at least a first area of interest;
identifying a plurality of time-of-flight cameras within the facility having the first area of interest within a field of view; and
selecting one of the plurality of time-of-flight cameras, wherein the second time-of-flight camera is the selected one of the plurality of time-of-flight cameras, and
wherein the second time-of-flight camera is programmed to capture depth images by illuminating at least the portion of the scene at the second frequency or during the second time slot in response to selecting the one of the plurality of time-of-flight cameras.

4. The facility of claim 1, wherein the method further comprises:
determining that at least one of a plurality of time-of-flight cameras within the facility other than the first time-of-flight camera is programmed to capture depth images by illuminating at least the portion of the scene at the first frequency or during the first time slot; and
selecting one of the plurality of time-of-flight cameras, wherein the second time-of-flight camera is the selected one of the plurality of time-of-flight cameras, and
wherein the second time-of-flight camera is programmed to capture depth images by illuminating at least the portion of the scene at the second frequency or during the second time slot in response to selecting the one of the plurality of time-of-flight cameras.

5. The facility of claim 1, wherein the first time-of-flight camera is configured to capture depth images at a first image rate,
wherein capturing the plurality of depth images comprises:
capturing the plurality of depth images by the first time-of-flight camera at the first image rate; and
selecting the subset of the plurality of depth images, wherein each of the depth images of the subset was captured by the first time-of-flight camera within a selected interval of time.

6. A method comprising:
configuring a first depth camera to capture depth images by illuminating a first field of view at a first frequency;
capturing at least a first plurality of depth images by the first depth camera, wherein capturing the first plurality of depth images comprises illuminating the first field of view at the first frequency, and wherein each of the first plurality of depth images comprises a predetermined number of pixel values;
determining, for each of the first plurality of depth images, a number of pixel values that are approximately equal to zero;
calculating, for each of the first plurality of depth images, a ratio of the number of pixel values that are approximately equal to zero to the predetermined number of pixel values;
determining that at least some of the ratios calculated for each of the first plurality of depth images are consistent with depth interference; and
in response to determining that at least some of the ratios calculated for each of the first plurality of depth images are consistent with depth interference,
storing an indication that the first depth camera is experiencing depth interference in at least one data store.

7. The method of claim 6, wherein the first depth camera is one of a plurality of depth cameras mounted within a facility,
wherein each of the plurality of depth cameras is in communication with a server, and
wherein the method further comprises:
selecting, by the server for each of the plurality of depth cameras, a frequency for illuminating a respective field of view of one of the plurality of depth cameras, wherein the first frequency is the selected frequency for the first depth camera;
configuring, by the server, each of the plurality of depth cameras to capture depth images by illuminating the respective field of view at the frequency selected for the respective depth camera; and capturing a plurality of depth images by each of the plurality of depth cameras, wherein capturing the plurality of depth images comprises illuminating the respective field of view at the frequency selected for the respective depth camera, wherein each of the plurality of depth images comprises a predetermined number of pixel values, and wherein the first plurality of depth images is the plurality of depth images captured by the first depth camera.

8. The method of claim 6, wherein the first depth camera is configured to capture depth images at a first image rate, wherein capturing at least the first plurality of depth images comprises:
capturing a second plurality of depth images by the first depth camera at the first image rate; and
selecting the first plurality of depth images from the second plurality of depth images, wherein each of the first plurality of depth images was captured by the first depth camera within a selected interval of time.

9. The method of claim 6, wherein determining that at least some of the ratios calculated for each of the first plurality of depth images are consistent with depth interference comprises:
generating a first plot of the at least some of the ratios; and
determining, based at least in part on the first plot, that the first depth camera is experiencing depth interference.

10. The method of claim 9, wherein the first plot is a difference plot comprising differences between ratios calculated for successively captured pairs of the first plurality of depth images on a first axis and times of capture for the first plurality of depth images on a second axis, and
wherein determining that at least the portion of the ratios calculated for each of the first plurality of depth images are consistent with depth interference further comprises:
determining that the difference plot comprises relative maximum and minimum values at substantially repeating intervals over time.

11. The method of claim 9, wherein determining that the first depth camera is experiencing depth interference comprises:
identifying a second plot of ratios of numbers of pixel values that are approximately equal to zero within a second plurality of depth images to predetermined numbers of pixel values of the second plurality of depth images; and
determining that the first plot is consistent with the second plot.

12. The method of claim 7, further comprising:
in response to determining that at least some of the ratios calculated for each of the first plurality of depth images are consistent with depth interference,
shutting down the first depth camera; or
configuring the first depth camera to capture depth images by illuminating the first field of view at a second frequency.

13. The method of claim 6, further comprising:
in response to determining that at least some of the ratios calculated for each of the first plurality of depth images are consistent with depth interference,
determining that a second depth camera is configured to capture depth images by illuminating a second field of view at the first frequency.

14. The method of claim 13, wherein the first field of view overlaps at least in part with the second field of view.

15. The method of claim 7, wherein that at least some of the ratios calculated for each of the first plurality of depth images are consistent with depth interference is determined at a first time, and
wherein the method further comprises:
determining times at which each of the plurality of depth cameras was configured to capture depth images by illuminating the respective field of view; and
identifying a second time, wherein the second time is a latest one of the times prior to the first time; and
selecting one of the plurality of depth cameras based at least in part on the second time.

16. A method comprising:
programming each of a plurality of depth cameras to capture depth images by illuminating at least a portion of a facility at a selected frequency or within a selected time slot, wherein the facility has a plurality of areas of interest, and wherein each of the plurality of depth cameras was programmed at a selected time;
capturing streams of depth images by each of the plurality of depth cameras, wherein each of the plurality of depth cameras has a field of view including at least one of the areas of interest;
selecting a first plurality of depth images of a first stream captured by a first depth camera, wherein the first depth camera is configured to capture depth images by illuminating at least a first area of interest at a first frequency or within a first time slot, and wherein each of the first plurality of depth images is captured during a first interval of time;
determining, for each of the first plurality of depth images, a number of pixels having a value of approximately zero;
calculating, for each of the first plurality of depth images, a ratio of the number of pixels having the value of approximately zero and a total number of pixels;
determining that at least one of the ratios calculated for each of the first plurality of depth images exceeds a predetermined threshold;
in response to determining that the at least one of the ratios calculated for each of the first plurality of depth images exceeds the predetermined threshold,
determining selected frequencies or selected time slots for each of the plurality of depth cameras;
determining the at least one area of interest included within fields of view of each of the plurality of depth cameras; and
determining times at which each of the plurality of depth cameras was configured to capture imaging data by illuminating the at least one area of interest of the scene;
selecting a second depth camera based at least in part on at least one of the selected frequencies, the selected time slots, the at least one area of interest or the times; and
programming the second depth camera to capture depth images by illuminating the at least one area of interest at a second frequency or a second time slot,
wherein the second frequency is not the first frequency, and
wherein the second time slot is not the first time slot.

17. The method of claim 16, wherein the second depth camera is one of the plurality of depth cameras programmed to capture depth images by illuminating the at least one area of interest at the first frequency or within the first time slot.

18. The method of claim 16, wherein a second field of view of the second depth camera includes the first area of interest.

19. The method of claim 16, wherein that the at least one of the ratios calculated for each of the first plurality of depth images is determined to exceed a predetermined threshold at a first time,
- wherein the second depth camera was programmed to capture depth images at a selected frequency at a second time, and
- wherein the second time is a latest one of the times prior to the first time.

20. The method of claim 16, wherein determining that the at least one of the ratios calculated for each of the first plurality of depth images exceeds the predetermined threshold comprises:
- generating a difference plot comprising differences between ratios calculated for successively captured pairs of the first plurality of depth images on a first axis and times of capture for the first plurality of depth images on a second axis; and
- determining, based at least in part on the difference plot, that the first depth camera is experiencing depth interference.

* * * * *